United States Patent
Main et al.

(10) Patent No.: US 10,469,472 B2
(45) Date of Patent: Nov. 5, 2019

(54) OPERATING SYSTEM INTEGRATED DOMAIN MANAGEMENT

(71) Applicant: CIS Maxwell, LLC, Ottawa (CA)

(72) Inventors: Alexander James Main, Ottawa (CA); James Henry Allan Puderer, Ottawa (CA)

(*) Notice: Subject to any disclaimer, the term of this patent is extended or adjusted under 35 U.S.C. 154(b) by 239 days.

(21) Appl. No.: 14/911,647

(22) PCT Filed: Aug. 11, 2014

(86) PCT No.: PCT/CA2014/050761
§ 371 (c)(1),
(2) Date: Feb. 11, 2016

(87) PCT Pub. No.: WO2015/021547
PCT Pub. Date: Feb. 19, 2015

(65) Prior Publication Data
US 2016/0196432 A1    Jul. 7, 2016

Related U.S. Application Data

(60) Provisional application No. 61/864,899, filed on Aug. 12, 2013, provisional application No. 62/026,272, filed on Jul. 18, 2014.

(51) Int. Cl.
*G06F 21/57* (2013.01)
*H04L 29/06* (2006.01)
(Continued)

(52) U.S. Cl.
CPC .............. *H04L 63/08* (2013.01); *G06F 8/61* (2013.01); *G06F 21/44* (2013.01); *G06F 21/57* (2013.01);
(Continued)

(58) Field of Classification Search
USPC ............ 726/1, 2, 21, 36; 713/150, 163, 181; 380/255, 264, 276
See application file for complete search history.

(56) References Cited

U.S. PATENT DOCUMENTS

| 3,403,389 A | * | 9/1968 | Main | G11C 17/02 |
| | | | | 365/54 |
| 8,204,480 B1 | * | 6/2012 | Lindteigen | H04L 63/083 |
| | | | | 455/411 |

(Continued)

FOREIGN PATENT DOCUMENTS

| CA | 2838205 A1 | 2/2004 |
| CN | 1584843 A | 2/2005 |

(Continued)

OTHER PUBLICATIONS

European Patent Application No. 14835861.7, Extended European Search Report dated Feb. 23, 2017.
(Continued)

*Primary Examiner* — Sharif E Ullah
(74) *Attorney, Agent, or Firm* — Borden Ladner Gervais LLP

(57) ABSTRACT

A computing device operating system providing a plurality of secure domains. A domain manager selectively creates a plurality of secure domains, and one of the secure domains is selected as a current domain. A domain policy service stores and enforces, for each secure domain, a policy comprising a rule set controlling access to files and applications associated with the domain. A package manager enforces, for each secure domain, installation of the applications associated with the domain. A domain message service provides communication between running processes associated with different ones of the secure domains. An activity manager selectively switches the current domain. Domain
(Continued)

isolation is achieved while enabling a unified user interface providing concurrent access to the resources of multiple domains.

16 Claims, 10 Drawing Sheets

(51) Int. Cl.

| | | |
|---|---|---|
| H04L 9/32 | (2006.01) | |
| H04W 12/06 | (2009.01) | |
| G06F 21/44 | (2013.01) | |
| H04W 12/08 | (2009.01) | |
| G06F 8/61 | (2018.01) | |
| G06F 21/62 | (2013.01) | |
| G06F 9/445 | (2018.01) | |

(52) U.S. Cl.
CPC ........ *G06F 21/6218* (2013.01); *H04L 9/3271* (2013.01); *H04L 63/0428* (2013.01); *H04L 63/06* (2013.01); *H04L 63/102* (2013.01); *H04L 63/20* (2013.01); *H04W 12/06* (2013.01); *H04W 12/08* (2013.01); *H04W 12/0806* (2019.01); *G06F 9/4451* (2013.01); *G06F 2221/034* (2013.01); *G06F 2221/2105* (2013.01); *G06F 2221/2149* (2013.01)

(56) References Cited

U.S. PATENT DOCUMENTS

| | | | |
|---|---|---|---|
| 8,300,810 B2 * | 10/2012 | Braun .................. | G06F 7/723 380/30 |
| 8,458,800 B1 * | 6/2013 | Van Voorhees ....... | H04L 63/105 726/26 |
| 8,544,084 B2 | 9/2013 | Owen et al. | |
| 8,561,160 B2 | 10/2013 | Kino | |
| 8,590,005 B2 | 11/2013 | Payne, Jr. et al. | |
| 8,656,016 B1 | 2/2014 | Bender et al. | |
| 8,667,267 B1 | 3/2014 | Garcia et al. | |
| 8,724,136 B2 | 5/2014 | Yamamoto | |
| 8,839,004 B1 * | 9/2014 | Bennett .................. | G06F 21/575 713/189 |
| 9,264,318 B2 * | 2/2016 | Quintana ................ | H04L 41/22 |
| 9,304,795 B2 * | 4/2016 | Kruglick ............ | G06F 9/45558 |
| 9,454,662 B1 * | 9/2016 | Buendgen .............. | G06F 21/575 |
| 9,521,126 B2 * | 12/2016 | Yarvis .................. | H04L 63/061 |
| 9,524,394 B2 * | 12/2016 | Bickford ................ | G06F 21/606 |
| 9,674,153 B2 * | 6/2017 | Cucinotta .............. | H04L 63/04 |
| 9,762,555 B2 * | 9/2017 | Hua ..................... | H04L 63/0435 |
| 9,830,456 B2 * | 11/2017 | Grieco .................. | G06F 21/572 |
| 9,832,199 B2 * | 11/2017 | Boivie .................. | H04L 63/10 |
| 2002/0123336 A1 | 9/2002 | Kamada | |
| 2003/0172293 A1 * | 9/2003 | Johnson ................. | G06F 21/50 726/22 |
| 2004/0268322 A1 * | 12/2004 | Chow .................... | G06F 21/14 717/136 |
| 2005/0039025 A1 * | 2/2005 | Main .................... | H04N 21/235 713/182 |
| 2005/0204041 A1 | 9/2005 | Blinn et al. | |
| 2005/0267984 A1 | 12/2005 | Costa-Requena et al. | |
| 2006/0009911 A1 * | 1/2006 | Burkholder ............ | G01V 1/003 702/18 |
| 2007/0055668 A1 * | 3/2007 | Main .................. | G06F 16/9535 |
| 2008/0037661 A1 | 2/2008 | Xun | |
| 2009/0031128 A1 | 1/2009 | French et al. | |
| 2009/0063624 A1 * | 3/2009 | Nordstrom ........ | H04M 1/72525 709/203 |
| 2009/0282473 A1 * | 11/2009 | Karlson ................ | H04L 63/102 726/17 |
| 2009/0318415 A1 * | 12/2009 | Brown .................. | A61K 31/554 514/211.13 |
| 2010/0062808 A1 | 3/2010 | Cha et al. | |
| 2010/0180338 A1 | 7/2010 | Stewart et al. | |
| 2011/0099605 A1 * | 4/2011 | Cha ........................ | H04W 12/06 726/3 |
| 2011/0296521 A1 * | 12/2011 | Bernabeu ............. | G06Q 20/341 726/19 |
| 2012/0054853 A1 * | 3/2012 | Gupta ...................... | G06F 21/53 726/17 |
| 2012/0144196 A1 * | 6/2012 | Owen .................. | H04L 63/0428 713/168 |
| 2012/0162257 A1 | 6/2012 | Kim | |
| 2013/0005360 A1 | 1/2013 | Issa et al. | |
| 2013/0054801 A1 | 2/2013 | Belchee et al. | |
| 2013/0097657 A1 * | 4/2013 | Cardamore ............. | H04L 63/20 726/1 |
| 2013/0138932 A1 * | 5/2013 | Draluk .................... | G06F 21/62 713/1 |
| 2013/0138954 A1 * | 5/2013 | Draluk ................ | G06F 21/6218 713/165 |
| 2013/0151704 A1 * | 6/2013 | Chandolu ............... | G06F 9/468 709/225 |
| 2013/0156035 A1 | 6/2013 | Lim et al. | |
| 2013/0295847 A1 | 11/2013 | Renard et al. | |
| 2013/0326606 A1 | 12/2013 | Kelly et al. | |
| 2014/0020068 A1 | 1/2014 | Desai et al. | |
| 2014/0058937 A1 | 2/2014 | Watson | |
| 2014/0115626 A1 * | 4/2014 | Sarda ................ | H04N 21/44016 725/34 |
| 2014/0214639 A1 | 7/2014 | Roach | |
| 2014/0344922 A1 | 11/2014 | Lam et al. | |
| 2014/0380425 A1 * | 12/2014 | Lockett ................... | H04L 63/20 726/4 |
| 2016/0196432 A1 * | 7/2016 | Main ........................ | G06F 8/61 726/1 |
| 2016/0301680 A1 * | 10/2016 | Main ..................... | H04W 12/08 |
| 2017/0176284 A1 * | 6/2017 | Main ..................... | G01M 5/005 |

FOREIGN PATENT DOCUMENTS

| | | |
|---|---|---|
| CN | 101661381 A | 3/2010 |
| CN | 102405630 A | 4/2012 |
| CN | 102567688 A | 7/2012 |
| WO | 2010027765 A2 | 3/2010 |
| WO | 2010123890 A1 | 10/2010 |
| WO | 2012170485 A1 | 12/2012 |

OTHER PUBLICATIONS

European Patent Application No. 14836724.6, Extended European Search Report dated Feb. 28, 2017.
International Preliminary Report on Patentability for International Patent Application No. PCT/CA2014/050762, dated Dec. 16, 2015, 4 pages.
International Preliminary Report on Patentability for International Application No. PCT/CA2014/051109, dated Feb. 29, 2016, 18 pages.
International Search Report and Written Opinion for International Application No. PCT/CA2014/051109, dated Jan. 22, 2015, 9 pages.
European Patent Application No. 14863353, Extended European Search Report dated Apr. 25, 2017.
International Patent Application No. PCT/CA2014/050762, International Search Report and Written Opinion dated Nov. 6, 2014.
International Patent Application No. PCT/CA2014/050761, International Search Report and Written Opinion dated Nov. 13, 2014.
Russello, G. et al., "MOSES: Supporting Operation Modes on Smartphones", Proceedings of the 17th ACM Symposium on Access Control Models and Technologies SACMAT'12, Newark, New Jersey, USA, Jun. 20-22, 2012, pp. 3-12, Jun. 20, 2012.
Bugiel, S. et al., "Practical and Lightweight Domain Isolation on Android", Proceedings of the 1st ACM workshop on Security and Privacy in Smartphones and Mobile Devices SPSM'11, Chicago, Illinois, USA, Oct. 17-21, 2011, pp. 51-62, Oct. 17, 2011.
Aciicmez, O. et al., "A Trusted Mobile Phone Prototype", Proceedings of 5th IEEE Consumer Communications and Networking

(56) References Cited

OTHER PUBLICATIONS

Conference CCNC 2008, Las Vegas, Nevada, USA, Jan. 10-12, 2008, pp. 1208-1209, Jan. 10, 2008.
Zhang, X. et al., "A Trusted Mobile Phone Reference Architecture via Secure Kernel", Proceedings of the 2nd ACM workshop on Scalable Trusted Computing STC'07, Alexandra, Virginia, USA, pp. 7-14, Nov. 2, 2007.
Lapolla, M. et al., "A Survey on Security for Mobile Devices", IEEE Communications Surveys & Tutorials, vol. 15, No. 1, first quarter 2013, pp. 446-471, Feb. 5, 2013.
Schmidt, A.U. et al., "On the Deployment of Mobile Trusted Modules", Proceedings of the IEEE Wireless Communications and Networking Conference WCNC 2008, Las Vegas, Nevada, USA, Mar. 31-Apr. 2, 2008, 6 pages, Mar. 31, 2008.
International Patent Application No. PCT/CA2014/050761, International Preliminary Report on Patentability dated Feb. 25, 2016.
U.S. Appl. No. 14/911,638, Non-Final Office Action dated Aug. 3, 2017.
U.S. Appl. No. 15/037,944, Non-Final Office Action dated Mar. 13, 2018.
Chen et al., "App Isolation: Get the Security of Multiple Browsers with Just One," Proceedings of the 18th ACM Conference on Computer and Communications Security, 2011, pp. 227-237.
Chinese Patent Application No. 201480054937.5, Office Action dated Jul. 24, 2018—English Translation Not Available.
Chinese Patent Application No. CN201480055972.9, Office Action dated Apr. 28, 2018—English Translation available.
European Patent Application No. 14863353.0, Office Action dated Jul. 12, 2018.
U.S. Appl. No. 15/037,944, Notice of Allowance dated Oct. 30, 2018.

\* cited by examiner

OPERATING SYSTEM INTEGRATED DOMAIN MANAGEMENT

FIELD

The present disclosure relates generally to mobile device security. More particularly, the present disclosure relates to secure domain management for mobile devices.

BACKGROUND

There is a need for multiple isolated domains on mobile devices, such as smartphones, tablets and mobile internet devices based on Android™, Linux™, or any Unix™-based operating system (e.g. such as an iPhone™), where the applications and data that reside in a domain are isolated from security threats that may result from applications that reside outside the domain, on a website, or in another domain on the same device. Such multiple secure domains would typically be used by a single user, the device owner, to address the variable ease of access, privacy and security requirements associated with different mobile device use cases. For example, a device owner may have different ease of access, privacy and security requirements for mobile banking applications and data than they have for games applications or a device owner may desire to share certain applications on their device temporarily with a family member or friend and not share other applications and data, such as personal emails, contacts and text messages. Additionally, there is a requirement for different domains to be managed by different entities, such as the device owner or an external party, such as an institution or corporation, wherein each entity may have different security requirements for access to and use of applications and data in the domain they manage. For example, the requirements may be different across domains for the applications allowed within each domain, and the conditions under which applications can execute within a domain, each of which may need to be configurable uniquely for each domain by the entity managing the domain. There is also a need to support different user authentication mechanisms, different re-authentication timeframes, (or optionally no authentication) required to enter different domains depending on the types of apps and data contained in the domain (e.g. a device owner may not wish to enter a password to play games or to access Google™ Maps but they may desire to have a strong form of authentication to access mobile banking applications).

The current state of the art for mobile device security and domain isolation has been to use traditional personal computer (PC) and server computing security technologies, such as user accounts, hypervisors/virtualization, application wrappers and anti-virus scanning. The typical use of mobile devices is materially different, however, from these traditional environments. Mobile devices are, by nature, mobile and always with the device owner. They are connected, always on and require quick access for short duration tasks. They are shared in a way that is materially different from traditional workstation and mainframe sharing. Power consumption is also critical to mobile devices, which is one reason that power hungry virus scanning and virtualization technologies have yet to be widely used on mobile devices.

One conventional domain isolation approach is to create separate user accounts on the device, whereby each user must log-in to an account that has been configured for the user. Depending on the operating system (OS), this may force another user to be logged out. This approach supports multiple users on a single device and separates or isolates each user's application data. The same operating system is leveraged across all users and all users have the same user interface features. An installed application is accessible to all users, which is an efficient use of memory and central processing unit (CPU) resources. This also allows a user to configure their account with the look and feel they desire.

While user accounts provide data isolation and the efficiency of using the same application and OS across different user accounts, this approach suffers the following limitations. It provides all-or-nothing access to the device, without the flexibility for temporary access. "Guest" user accounts may be set up with limited access, but this does not facilitate the spontaneous sharing that is common with mobile devices (e.g. with a family member or friend). User accounts are not typically available on mobile devices, which are considered personal devices. The user must still switch between each user account, which does not reflect the way people desire to use their mobile devices. The user must log-in when switching user accounts which further inconveniences this approach, as there is no implied relationship between the first user and a second user with multi-user accounts. There is typically no inactivity timer or similar mechanism so that log-in is not always required when switching domains. The isolation between users (accounts) is at user space, or application level, and enforced by the OS. Anyone or any software with administrator or root access, including malware, can access the data of all users. Some systems do enable encryption of some user data to help mitigate this attack, but generally the user data is still highly vulnerable and any kernel level exploit or process can modify applications, processes, intercept data and access any files/objects it desires.

Moreover, conventional user accounts, which were developed at the time of mainframe computers and extended to desktops similarly, do not work well on a truly personal device such as a smartphone. Mobile devices are shared differently than mainframes or desktop computers. There is increasingly a desire from device owners and users to have an alternative to the traditional screen lock or 'all-or-nothing' access control mechanisms on mobile devices. For example, it is desirable for the device owner to have applications that are frequently accessed and that do not contain sensitive information in a domain that does not require user authentication; this is different from the requirements for a personal protected domain or a work protected domain. The primary goal of such an open, shared or common domain is the ease of use and quick access when the security of such applications and data are deemed not to be important by the user (e.g. weather or navigation). As such, the user does not want to enter a password or PIN each time they access such an open domain. Additionally, such an open domain could include applications that may be less trustworthy than those that the user or a domain owner may allow in their protected domain. For example, many applications on Android are known to access the contact database. Finally, while this permission must be granted during install time to enable installation of the application, many users do not check this closely or understand the implications of granting such permission.

Further conventional domain isolation approaches are now described with reference to FIGS. 1A to 1D.

As is known in the art, and as illustrated in FIG. 1A, a computing device such as a mobile device implementing an operating system may be understood as including hardware, an operating system including a kernel and middleware, and application space (or user space). The kernel manages and provides input/output (I/O) services to software applications for access to the hardware, and the middleware provides services to software applications additional to those provided by the kernel.

One conventional domain isolation approach illustrated in FIGS. 1B & 1C employs hypervisor-based virtualization or virtual machines. With virtual machines the operating system is duplicated to some degree to provide different isolated domains. There are different types of virtual machines depending on the hypervisor. A Type 1 (or bare-metal) hypervisor illustrated in FIG. 1B runs directly on the device CPU ('bare metal') and provides isolation of domains by supporting complete and separate deprivileged instances of the operating system for each domain. Isolation depends solely on the hypervisor. Type 2 hypervisors illustrated in FIG. 10 are another virtualization approach, wherein a second guest OS runs on top of a host OS. There are other hybrid operating-system level virtualization approaches as well.

Hypervisor-based virtualization provides isolation between domains but suffers from the following limitations. Duplication of the OS and applications means that there is significant device overhead in terms of device memory, CPU and power consumption. The high resources requirements for hypervisor solutions make the support of multiple domains impractical. Data, application sharing and inter-process communications (IPC) are ordinarily not possible, although some cross domain data sharing is proposed through special messaging services if supported by the hypervisor. Each OS is exposed to kernel layer malware that may undermine the isolation between the domains. The user must toggle back and forth between domains (e.g. to switch from a personal app to a work app), which does not reflect the manner in which people desire to use their mobile devices. The time and overhead to integrate a Type 1 or Type 2 hypervisor onto a mobile device is very high making this approach infeasible for low cost mobile devices. The performance impact of toggling between domains is high. Finally, such solutions support whatever user account and user authentication is provided by each OS, which is traditional all-or-nothing access.

A third conventional approach to domain isolation on mobile devices, illustrated in FIG. 1D, involves application-level containerization. In this case, the application containers (or domains) share the same hardware and OS, but use containerization or wrapper technology to act as a proxy between the applications in the container and the OS. This creates multiple independent domains by providing a layer of indirection so that the lower level device resources, memory and file system can be transparently mapped to higher-level resources that should be accessible only by applications in the container or domain. Containerization is relatively efficient in terms of the consumption of mobile device resources, especially compared to virtualization as there is only one version of the OS, although applications are usually duplicated inside the container and outside the container (e.g. an email app that may be used for work inside the container and for personal use outside the container). As an application level solution, container solutions have a very practical benefit in that it can be downloaded to devices already in the field (e.g. reverse compatibility).

In containerization, all of the security and all of the enforcements are wrapped around the container that contains applications. As such, anyone who downloads a contained application receives not only the application, but also all the security information associated with that application. With containerization, it remains possible for malicious individuals either: (1) to reverse engineer security policy; or (2) to execute the application in an environment such as on an emulator where information can be extracted from it.

Application-level containerization as an approach to domain isolation suffers, however, from the following limitations. From a security perspective, it is relatively easy for a hacker with some basic skills, or malware resident on the device, to intercept the calls between the container and the OS to break the isolation and capture data and personal information. Containerization is not enforced in the operating system or kernel and is exposed to malware that may be present on the device. For example, if the operating system is Linux or Android and an attacker gains root access privilege, it is relatively simple to extract domain data or other critical information from RAM (e.g. passwords used to access the domain, or cryptographic keys used to encrypt data in the domain) or for such kernel layer malware to eavesdrop on I/O drivers, such as the microphone or frame buffer. Containers isolate the applications and data that are "wrapped" by the container, but do not limit access by other applications not in the container from accessing memory, files or networks, etc. Sharing a single application image across domains is not possible and such technology does not allow the same application both inside and outside a container. As a result, a container will typically only support pre-determined applications that have been modified to the container, such as mail, messaging, browsing, contacts, calendar, etc. This does not provide the application choice that users or a corporate IT department desire. Common applications must be modified to support the container, which duplicates storage and memory on the device and increases the effort and involvement of the application developer. Often a private application store must be created specific for the container solution, which increases lock-in to a vendor solution and requires involvement by the application developer, further limiting choice. With application wrapping approaches, the executable code may need to be patched with security libraries that control how data is stored, shared and transmitted. This introduces license and copyright issues as licenses do not typically authorize the licensee to modify an application. The user must still toggle back and forth between domains or containers, which doesn't reflect the way people use their mobile devices. Finally, the domain typically has its own pre-determined user interface, which is different from the native OS user experience and cannot be customized by the device user.

A yet further approach to domain isolation is a kernel level platform security approach in the device operating system, such as Security Enhanced Linux™ (SELinux™). SELinux provides mandatory access control (MAC) for applications and users to objects and resources, such as files. Each user, or application is assigned a security label and a policy can be assigned to all labels. SELinux may be used for role-based access controls combined with a domain switching mechanism, although Android™ does not use user identifiers in such a manner. SELinux uses a special kernel module that relies on the Linux Security Module (LSM) interface in Linux to enforce isolation between processes based on the security policy. Applications can be verified against the SELinux policy before loading and all processes can be confined to pre-determined access such that one application cannot launch or access another process, directories or data if that is not allowed by the policy. With the right policy mechanisms, applications, malware and even kernel root kits can be prevented from accessing the applications and data that belong to another user or application.

While a native OS solution has many advantages from a security, performance and application isolation perspective compared to containers and compared to virtualization approaches, it suffers from the drawback that the kernel does not have sufficient visibility to the middleware level to be able to enforce domain isolation required at the middleware levels.

Moreover, kernel-level platform security as an approach to domain isolation suffers the following limitations. Such kernel module approaches do not have any user interface or the concept of domains, but typically use existing traditional user accounts, including allowing root or administrator accounts that have privileges across all domains. The kernel module used in this approach is very low in the operating system and does not have granular, application specific information to provide the type of policy control (e.g. user authentication policy for a domain) and application control (e.g. restriction of applications to certain domains) needed to meet the requirements of consumer and corporate uses of isolated domains on a mobile device. Extending SELinux type policy language and enforcement to the middleware significantly increases complexity of the solution. Such policies are typically static and not updated. There have been projects to provide remote policy updates for SELinux, but policies apply to the whole device and are not unique for each domain. Inter-Process Communications (IPC), on Android for example, are difficult to monitor, because the permission checks and caller/callee checks are performed in the Android Middleware and the kernel does not have access to enough information to monitor and control IPC between domains. Finally, there is typically not granular enough control of the user and application access to define inter-domain data sharing, which raises issues with data leakage, which is not acceptable for certain types of data. While this may be acceptable for some shared applications (e.g. camera and picture gallery), there is a higher degree granularity needed for documents and document reader applications (e.g. pdf viewer) that is not possible with a kernel level solution.

Another conventional approach to providing security is encrypted filesystems, such as a cryptographic stacked filesystem. For example, the eCryptFS filesystem (http://ecryptfs.org) is a POSIX-compliant enterprise cryptographic stacked filesystem for Linux. Encrypted filesystems are not a suitable means, however, for providing multiple domains.

It is, therefore, desirable to provide means for creating multiple domains on mobile devices where the applications and data that reside in a domain are isolated from security threats that may result from applications that reside outside the domain on a website or in another domain on the same device, and which mitigates one or more disadvantages of each of the conventional approaches described above, provides advantages over such conventional approaches, or provides an alternative to such convention approaches.

BRIEF DESCRIPTION OF THE DRAWINGS

Embodiments of the present disclosure will now be described, by way of example only, with reference to the attached Figures.

DESCRIPTION

Figure 1A:
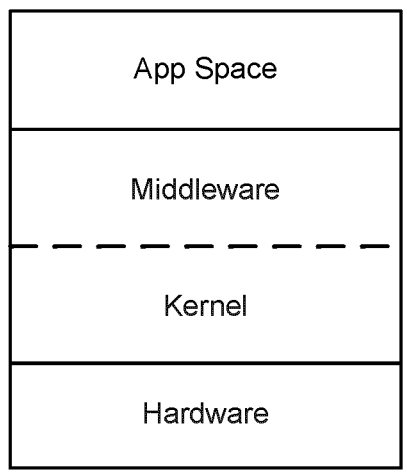
FIGS. 1A, 1B, 1C, and 1D show block diagrams illustrating operating system structure and conventional methods for domain isolation.
Figure 1B:
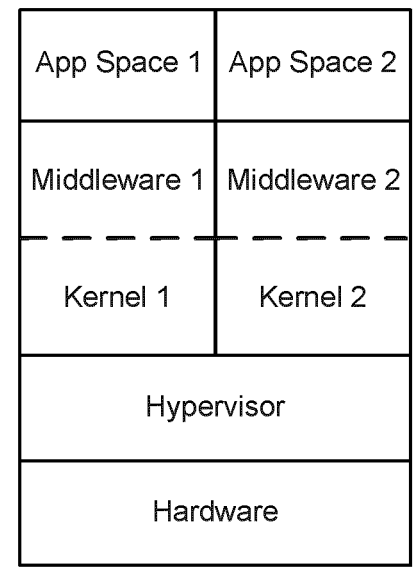
Figure 1C:
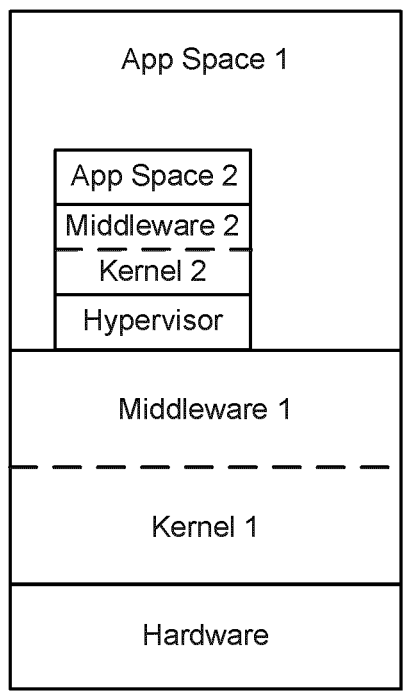
Figure 1D:
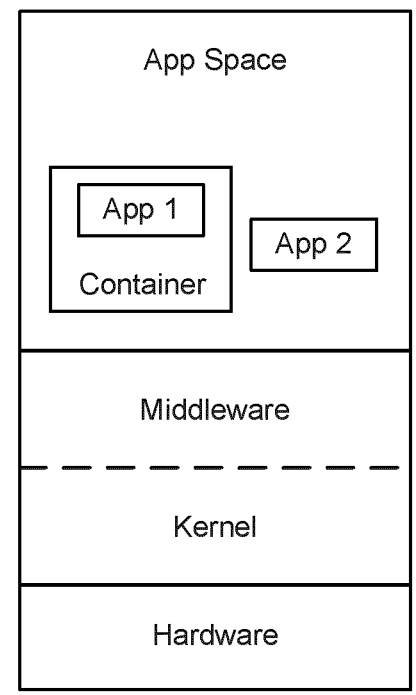

The solution disclosed herein provides flexible, efficient, and secure isolated domains and management of such domains for mobile devices and mitigates one or more disadvantages of each of the conventional approaches described above, provides advantages over such conventional approaches, or provides an alternative to such conventional approaches.

The following factors are relevant to a solution which overcomes the above drawbacks of conventional methods. Firstly, there has been a shift in recent years from the use of mobile devices primarily for mobile telephony and SMS (Short Message Service) to the use of mobile devices for web browsing, social networking, gaming, email, instant messaging, location based services and mobile commerce. With broad Internet connectivity via service providers and WiFi, mobile computing is always connected and truly mobile. In addition, due to the proliferation of applications and the capabilities of devices including sensors such as cameras, GPS, accelerometers, barometers, etc., there are many more diverse usages of the mobile device. They are used for entertainment, social networking, camera/video, navigation, accessing cloud services for both personal (e.g. photo sharing), or work (e.g. corporate CRM systems) or combined (e.g. file sharing such as Drop Box), plus many forms of messaging from text, chat, email and voice, either over IP or traditional phone networks. Also, with the increasing power, connectivity and number of applications on such mobile devices, users increasingly store and track more sensitive information on these devices (e.g. personal data, credentials, cryptographic keys, credit card numbers, passwords, contacts, past location, current location, web surfing history, installed applications and current device status (e.g. not moving), etc.). This sensitive information is often the target of malicious users and malicious software (malware). Moreover, inasmuch as mobile devices are carried with the person, and due to their extensive capabilities, there is a desire to be able quickly to access these devices for a quick reply, a quick web search, etc. The use of a traditional device lock produces an inconvenience. For example, it may be undesirable for the user to enter a password, to unlock the device, in order to look up a word in a dictionary. In addition, mobile devices are often shared (or desired to be shared), e.g. for temporary purposes, such as making a phone call, letting a family member play a game, or in vehicle navigation while the device owner is driving. This is vastly different than traditional user accounts in a traditional computing or server environment, where one device or service is shared between multiple people, but where the users are known in advance and such shared usage tends to be on an ongoing and regular basis. In addition, due to the smaller form factor of mobile devices and the frequency and location of use, mobile devices are lost or stolen much more frequently than laptops or PC's and hence may fall into the hands of an attacker. Many users and enterprises require a means to remotely lock, locate and/or "wipe" (delete all applications and data from the device) mobile device that are lost or stolen, including smartphone anti-theft regulations in some countries (http://www.ctia.org/policy-initiatives/voluntary-guidelines/smartphone-anti-theft-voluntary-commitment). Also, it has been common for an employee in a corporate environment to use a single device for both personal and work use. This is another form of sharing—but only of the hardware and network services—where the security, privacy and data isolation requirements are higher since the corporation desires to own and control the dissemination of work data (e.g. especially in the event of employee termination), and the user may have private data that he does not want to share with the employer. In many cases the same applications may be used for both personal and corporate usage—as this improves productivity—yet the application data must be isolated so that corporate data can be deleted (wiped) without impacting the personal data, or vice versa. Moreover, because of device capabilities, sensitive information, sharing and dual usage there is an increasing need for privacy and flexible access control. Often notifications display sensitive personal information (chat messages, software upgrades, advertisements), which device owners do not always want everyone to see or have access to. Users want the flexibility to lend their device, but desire to limit access to certain capabilities and/or services such as read only, receive phone calls only, or certain accounts (e.g. Facebook). Many users face choosing between the dissatisfactory alternatives of an all-or-nothing device lock, versus not securing the device at all. Finally, mobile devices by nature connect to more networks than PC's (e.g. WiFi networks in restaurants, hotels and airports), which exposes these devices to more network based attacks, intrusions and packet capture. In addition, mobile device users have access to third party app stores that enable users to download applications that may contain malicious software (malware). For example, mobile devices based on the Android operating system now accounts for over 90% of malware targeting mobile devices.

A 'domain' may be considered herein to stand for a relationship between a set of resources—data files, applications, and services, for example—and a rule set, or 'policy', whereby access by processes to the resources is controlled at least in part by the policy. For example, a particular domain may be considered to include or contain a number of data files which are associated with that domain, and access to the data files is controlled at least in part by a policy defined in association with that domain. Similarly, an application may be installed or otherwise associated with a particular domain, and access to that application, including the ability to execute the application, for example, is controlled at least in part by a policy defined in association with that domain.

For example, it is desirable in a single-user device to be able to provide multiple domains having different policies providing different access to selected applications and other resources. In one case, it may be desirable to provide a restricted domain which requires authentication and contains data or applications which are intended to be inaccessible to children, and a kids mode domain which does not require authentication and is intended to be accessible to children (to play games, for example). When operating in the open domain, therefore, it is desirable for the data or applications of the restricted domain to be inaccessible to processes associated with the open domain.

Some of the desirable functionality of domains, as discussed above, may be provided by conventional user accounts commonly implemented in multi-user operating systems. Such user accounts may be considered to constitute a type of domain inasmuch as a user account stands for, among other things, a set of resources (e.g. a user's data files, applications) and a rule set, or policy, associated with that user account (e.g. permissions, privileges) which control access to the user's resources.

Conventional user accounts are an inappropriate means, however, for providing both the benefit of secure isolation of different domain resources as well as a convenient and unified single-user experience on a mobile device. In addition to the above desirable functionality, providing the desired experience also requires the ability to perform actions which involve both domains concurrently, e.g. copying-and-pasting from one domain to another, providing a single user interface which provides concurrent access to the resources of multiple domains, or opening from a mail client operating in a first domain an email associated with a second domain. Conventional user accounts are not intended to enable such functionality as the user isolation controls which are typically integrated in operating system services, and which follow logically from the presumption that different user accounts are intended to be used by different individuals, do not permit, or do not readily enable, the ready sharing and cooperation of the processes and resources of different domains which is required in order to enable desirable functionality wherein the domains are used concurrently by an individual.

While, as discussed above, alternative isolation mechanisms such as virtualization and containerization may not be limited in the same way as user accounts, they suffer from different disadvantages as discussed above. It is therefore desirable to provide isolated domain management as an integrated aspect of an operating system. And, while as also discussed above, some desirable functionality may be provided by means of services residing in the kernel of an operating system, current operating system kernels do not generally enable or permit domain signaling and domain management sufficient to provide the process sharing and cooperation needed for actions concurrently involving multiple domains.

As such, the disclosed solution provides for domain awareness via modification to existing components or services of the operating system or the introduction of new components or services. In some embodiments, at least some of the components and services are provided in the operating system outside of the kernel, that is in the middleware (used herein to mean the operating system outside of the kernel, and between the kernel and user applications). In some embodiments, at least some of the components and services are provided in the operating system kernel. In some embodiments, domain creation and management is enabled by modified or new components or services of the operating system middleware, and domain enforcement is performed by the operating system kernel, and modified or new kernel modules, or kernel modifications, are provided for this purpose.

Thus, in a first embodiment, in a mobile device comprising a processor and a memory storing instructions executable by the processor to implement an Android operating system, an improvement comprises: a user manager for selectively creating a plurality of domains different from any user accounts implemented in the Android operating system;

a domain manager for selecting one of the domains as a current domain; a domain policy service for storing and enforcing, for each domain, a policy comprising a rule set controlling access to files and applications associated with the domain; a package manager for, for each domain, selectively allowing or blocking installation or execution of the applications associated with the domain, based on the policy of the domain and the policy of the current domain; a domain message service for providing communication between running processes associated with different ones of the domains based on the respective policies of the different ones of the domains; and an activity manager for selectively switching the current domain, wherein the user manager, the domain manager, the domain policy service, the package manager, the domain message service, and the activity manager are implemented in the Android operating system outside a kernel of the Android operating system. The improvement may further comprise: a domain kernel module for enforcing, for each domain, the policy associated with the domain, wherein the domain kernel module is implemented in the kernel of the Android operating system.

In a second embodiment, a method performed by a processor of a computing device to provide a plurality of secure domains in an operating system of the computing device comprises: (a) for each secure domain: (a1) associating resources of the secure domain with a unique domain identifier, the resources comprising at least one data file or at least one application; and (a2) storing a policy in association with the unique domain identifier, the policy comprising a rule set for controlling access to the resources; (b) receiving a selection of one of the plurality of secure domains as a current domain, wherein the plurality of secure domains comprises a target domain different from the current domain; and (c) controlling access to the target domain resources based on the policy associated with the current domain and the policy associated with the target domain.

In a third embodiment, a method of providing a plurality of secure domains in an operating system of a computing device comprises: (a) for each secure domain: (a1) associating resources of the secure domain with a unique domain identifier associated with the secure domain, the resources comprising at least one data file or at least one application; and (a2) storing a policy in association with the unique domain identifier, the policy comprising a rule set for controlling access to the resources; (b) generating an event message associated with an originating process associated with a first one of the secure domains; (c) determining that a target process associated with a second one of the secure domains is configured to respond to the event message; (d) processing the event message based on the policy associated with the first domain and the policy associated with the second domain, to produce a processed event message; and (e) passing or blocking the processed event message to the target process based on the policy associated with the first domain and the policy associated with the second domain.

In a fourth embodiment, a method of providing a plurality of secure domains in an operating system of a computing device comprises: (a) for each secure domain: (a1) associating resources of the secure domain with a unique domain identifier associated with the secure domain, the resources comprising at least one data file or at least one application; and (a2) storing a policy in association with the unique domain identifier, the policy comprising a rule set for controlling access to the resources; (b) receiving from an originating process associated with a first one of the secure domains a request to launch a target process associated with a second one of the secure domains; and (c) processing the request based on the policy associated with the first domain and the policy associated with the second domain.

In a fifth embodiment, in a data processing system having a processor and a storage mechanism for storing an operating system that includes a kernel and a middleware outside of the kernel, a method comprises: providing a first facility in the middleware for creating domains and associating with the domains corresponding policies for controlling access to the domains; providing a second facility in the middleware for switching between the domains; and providing a third facility at least partly in the middleware for enforcing the corresponding policies of the domains.

In a sixth embodiment, a computing device comprises a processor and a memory storing instructions executable by the processor to implement an operating system providing a plurality of secure domains, and the operating system comprises: a domain manager for selectively creating the plurality of secure domains, and for selecting one of the secure domains as a current domain; a domain policy service for storing and enforcing, for each secure domain, a policy comprising a rule set controlling access to files and applications associated with the domain; a package manager for enforcing, for each secure domain, installation of the applications associated with the domain; a domain message service for providing communication between running processes associated with different ones of the secure domains; and an activity manager for selectively switching the current domain.

An exemplary system 100 for providing isolated domains is now described with reference to FIG. 2.

The system may be implemented in any computing device including a mobile device such as a smartphone, tablet, laptop, or a desktop, or any other electronic device having a volatile memory and a processor, the volatile memory containing computer code executable by the processor to provide an operating system and software applications (or "applications" or "apps"). The computing device may further include an interface, which may include a user input device such as a keyboard, pointing device, touchscreen, and may further include a communications interface such as a radio and associated control circuitry for communicating over a wired or wireless communications network, which may be the Internet and/or a cellular or WiFi link or Bluetooth, or near field communication (NFC).

The operating system may be characterized as including a kernel, which manages and provides input/output (I/O) services to software applications from the processor and other hardware components of the device, and middleware which provides services additional to those provided by the kernel.

In general, the present solution includes modifying operating-system-level protocols to enable domain-awareness. A plurality of domains is created on the mobile device. In embodiments described hereinafter the operating system is Android™, although such selection should not be construed as limiting the intended scope of the solution. Android is used only as an example and is similar to other multi-user operating systems (e.g. QNX, Windows).

Figure 2:
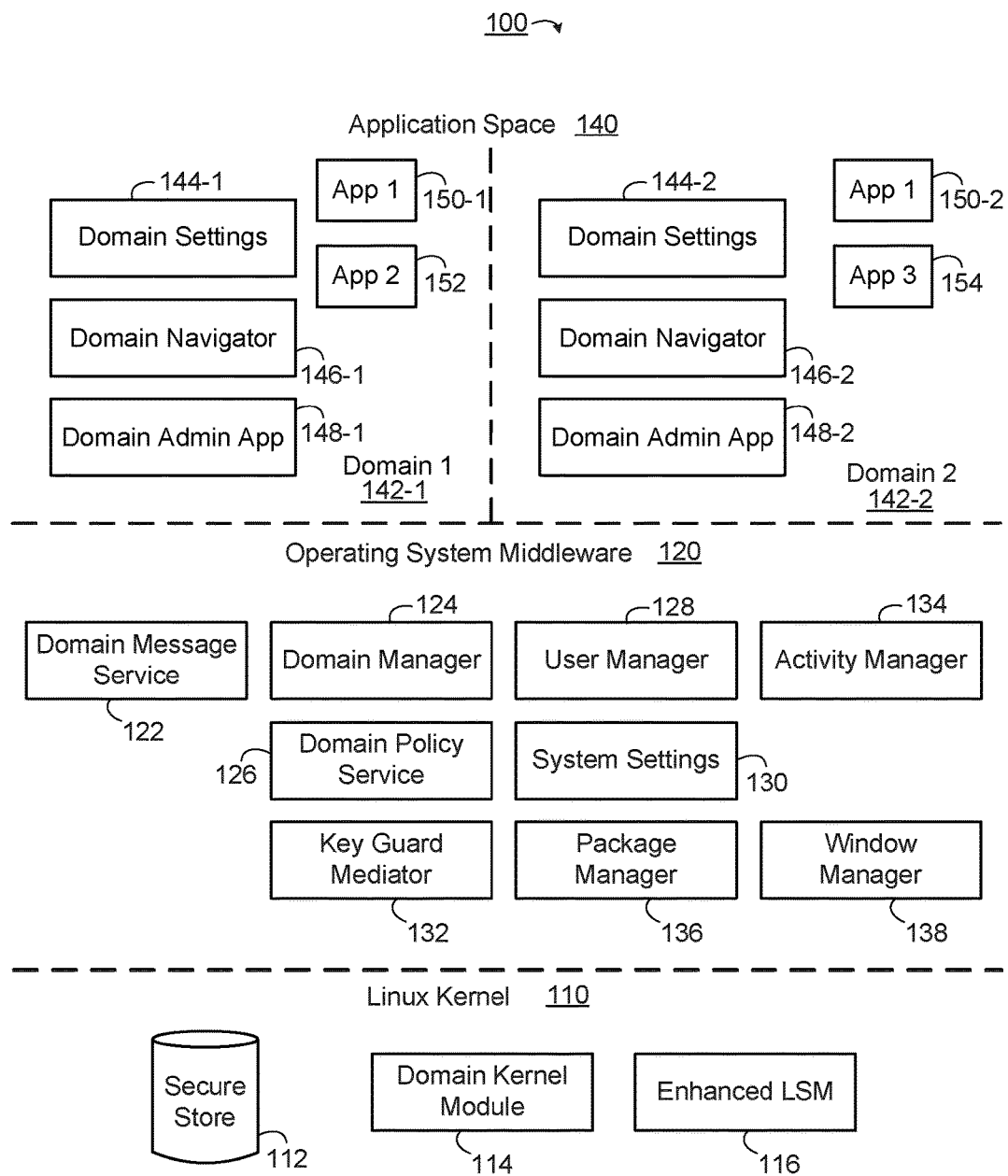
FIG. 2 shows a block diagram illustrating an inventive system for providing isolated domains.

Thus, as shown in FIG. 2, the system 100 includes a kernel, which is a Linux™ kernel 110 when the system 100 is implemented in a mobile device running an Android™ operating system. The kernel 100 includes: a secure data store 112, a Domain Kernel Module 116, and a Linux Security Module 114, which in one embodiment is an Enhanced Linux Security Module, whose respective functions will be discussed further below. It will be understood by persons of ordinary skill in the art that the kernel 110 may further have further conventional components (e.g. drivers), or other components different from the foregoing.

The system 100 further includes operating system middleware 120 including: a Domain Message Service 122, a Domain Manager 124, a Domain Policy Service 126, a User Manager 128, a System Settings Module 130, a Key Guard Mediator 132, an Activity Manager 134, a Package Manager 136, and a Window Manager 138. The User Manager 128, System Settings Module 130, Key Guard Mediator 132, Activity Manager 134, Package Manager 136, and the Window Manager 138 correspond to and possess the respective functionalities of known components or services of Android™, but modified to be domain-aware as discussed below. The Domain Message Service 122, the Domain Manager 124, and the Domain Policy Service 126 are additional components whose functionalities are discussed below.

The system 100 further includes an applications space 140 (or user space) for implementing one or more domains. For the purposes of illustration, a first domain 142-1 and a second domain 142-2 are shown, but it will be understood that any number of domains may be implemented. Each domain may include an instantiation of a Domain Settings Module, such as first and second instantiations of Domain Settings Module 144-1, 144-2, and in general will include first and second instantiations of a Domain Navigator Module 146-1, 146-2 and a Domain Administration Application 148-1, 148-2. Each domain may also have separate instantiations of a first application 150-1, 150-2, while the first domain 142-1 may instantiate a second application 152 different from a third application 154 instantiated in the second domain 142-2.

Domains

A domain, such as first domain 142-1 and second domain 142-2, is an isolated area that keeps any apps and the data associated with those apps separate. Domains may be controlled remotely (e.g. by a corporate information technology (IT) manager) or locally (e.g. by the device owner) to specify the apps, data, configuration, connectivity and security policy for the particular domain. For example, network access from a particular domain may be controlled. The password re-authentication time may be controlled (e.g. so that a user does not need to re-authenticate when switching domains within a specified period). An administrator of the domain typically has such control. The administrator may be a personal user, or a corporate IT manager or other remote entity.

Due to their isolation and segregated nature, domains as discussed herein can be considered to be protected domains. For example, one domain may be externally-managed by a corporation that does not want its information and proprietary business applications to be compromised in the event the device is lost or stolen, or if the device is compromised by malware downloaded by device owner in another domain. The device owner does not want the corporation to track their preferences, web surfing habits or personal communications, so he wants his own protected domain as well. Yet, the device owner does not want the same level of authentication to be applied to all applications and services on the device, but be assured that data in protected domains are still secure.

Providing multiple domains provides the device owner with an alternative to traditional "all-or-nothing" device access control. With the ability to support both secure and open domains, access can be configured by the user as needed, with varying log-out times and access control (e.g. PIN, password, facial recognition, or nothing). This flexibility reduces the likelihood of not using any password on the device at all due to inconvenience, while also giving the owner of the device choice independent of remote administrators.

Figure 3:
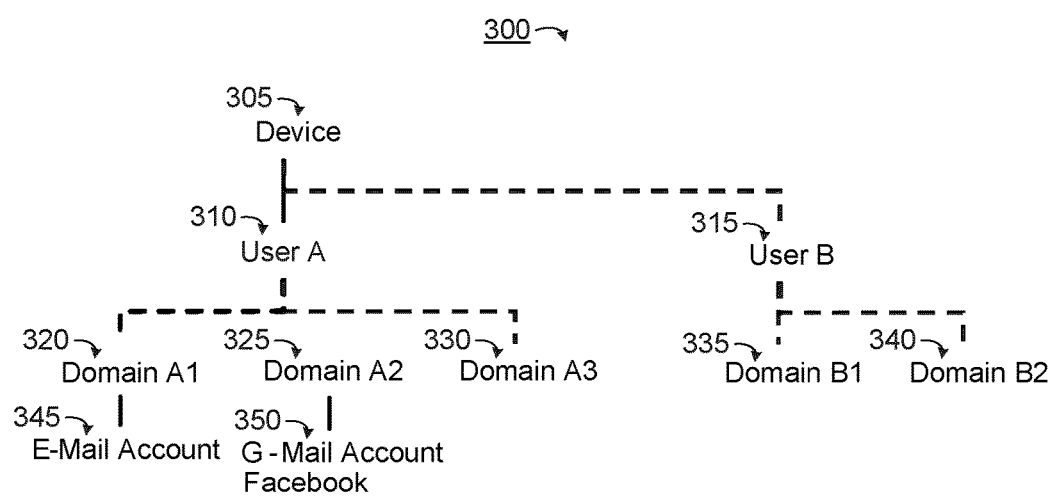
FIG. 3 shows a schematic diagram illustrating an implementation of multiple user accounts and multiple domains.

By way of example only, FIG. 3 shows a schematic diagram 300 wherein a device 305 implementing the system 100 is configured with two users, User A 310 and User B 315, wherein three domains A1 320, A2 325, A3 330 are created in association with User A, and two domains B1 335 and B2 340 are created in association with User B. As shown, the policy of Domain A1 may permit access to a selected email account 345, while the policy of Domain A2 may permit access to a Gmail™ account and to Facebook™ 350.

For the sake of clarity, a device implementing the system 100 may also be configured with only one user, and yet multiple domains as described herein may be created and the methods and protocols also described herein implemented in connection with such multiple domains.

Domain Awareness

Domain awareness may be provided based on the user identifier (UID) and group identifier (GID) concepts implemented in the Unix™ and Linux™ operating systems. The UID and GID are used in Unix and Linux to assign permissions to processes and files. A superuser, or root, is typically assigned UID 0, and other ranges are often reserved for system processes.

In Android™, however, the UID is not used to represent users; instead, each application is allocated a unique UID and GID when it is installed, and this (UID, GID) pair, which may be considered an application identifier, is assigned to the processes and data files associated with the application. In a recent version of Android™ (Android 4.2), multi-user capabilities were introduced, which added signaling throughout the operating system to indicate which user account is active. Certain bits in the UID are reserved to represent the user account, and thus constitute a user identifier. When a process is launched, this user identifier is combined with the application identifier assigned to the application on installation to create an execution context identifier to represent the context of the running process and associated private data files. With this signaling, application data can be created and stored independently based on the user.

As compared to previous versions, the services of Android™ 4.2 have been modified to be user account aware. For example, and with reference to FIG. 2, the Android Package Manager 136 was modified to control which applications are available for each user. Similarly, the Window Manager 138 was modified to control what is displayed for each user; and the Activity Manager 134 was modified to control the launching of applications and enforcement of permissions for each user. In addition, a new service, called the User Manager 128, was added in Android 4.2 and handles the creation, authentication, deletion and switching between users.

In one embodiment of the present solution, a domain-aware signaling mechanism is added to the operating system which is similar to multi-user capabilities that were added in Android™ 4.2, with existing services modified to become domain aware. Specifically, domain signaling is added by way of an extension to the UID, or as an addition of a new field, which constitutes a domain identifier or "DID". Predetermined bits in the UID are reserved to represent a domain, and are combined with the application identifier assigned to an application on installation to create an execution context identifier to represent the context of the running process and associated private data files with respect to that domain. In one embodiment, the Package Manager 136 is configured so as to maintain a list of associations between the application identifier of each installed application and each domain. The execution context identifier is then created for a process based on the application identifier of the application and the domain identifier of the domain in which the application is executed. In one embodiment, the UID also has reserved bits associated with a particular user account. Such an approach of reserving or extending the UID field to also represent the domain reduces the degree of operating system changes, simplifies the implementation, and reduces time to deployment.

In one embodiment, a new service called Domain Manager 124 is implemented to manage the creation, authentication, and deletion of domains, which are described below.

An alternative method to make the system domain-aware is to use security labels, such as how SELinux identifies different resources and objects. In some embodiments SELinux security labels are used for such purpose. In other embodiments another label or parameter that identifies domains is added.

Domain Creation

In one embodiment, the User Manager 128 functionality is modified to enable both adding a new user and also adding a domain, which may be considered similar to a sub-account for a single user. Doing so enables multiple domains to be associated with each user account. Modifying the User Manager 128 functionality provides certain advantages. For example, in implementations having multiple users (as is shown in FIG. 3, for example), it is advantageous for domain creation to be integrated with user creation in the User Manager 128. In an alternative embodiment having only a single user (e.g. on a smartphone not supporting multiple user accounts), such functionality may be implemented in the Domain Manager 124.

Thus, in one embodiment, the User Manager 128 is modified so as to provide one or more of the following: (i) to allow easy switching between domains under a single user, without prompting the typical log-in screen; (ii) to remain logged in to a domain or domains when switching to another domain for a period of time specified in the policy for such domain; and (iii) to keep domains active to facilitate quick switching between domains. With the additional domain signaling, the User Manager 128 may be configured to ask for a username only when there is more than one user account.

In the case of creating a new domain, the User Manager 128 may call the Domain Manager Service 124. Creating a new domain may be similar to creating a new user, with differences specific to domains applied, such as new user welcome screens would be skipped. During domain creation, the Package Manager 136 may be called automatically to install pre-existing applications or download new applications to the new domain. The Domain Policy Service 126 may set a default policy and wizards may be executed to help the user tailor the policy for the new domain as desired.

In the event of creation of a work domain (or any other domain whose policy is externally-controlled at least in part by an entity other than the device owner), the domain may be registered with a remote domain management server for that particular work domain. This may require registration using the user's work credentials. The server would approve the creation of such work domain and then download policy, icons, credentials, files, wallpaper and applications specific for the user group, the device and the work domain.

Domain Policies

Upon the creation of a domain, a respective security policy, comprising a policy specification or policy data, is stored in association with it. In some embodiments, at least some domain-specific and cross-domain policy is enforced at the application level and/or middleware level (e.g. authentication time-out). In some embodiments, isolation of processes and entities associated with each domain is enforced at least in part at the kernel level and in accordance with the respective security policies for the plurality of domains. In some embodiments, isolation is enforced at least in part at the middleware level, that is by operating system services and facilities operating outside of the kernel. The respective policies associated with each domain may be different depending upon the intended role of the domain or its relationship or association with other entities, such as a corporate enterprise service.

For example, in different embodiments, one or more policies may be: (i) pre-determined and static; (ii) pre-determined, but with some run-time configuration or selection; (iii) downloaded after configuration on a management server; or (iv) user configurable on the device. The specific parameters of the respective policies may take into account any pertinent conditions or variables, again relating to the particular role of the associated domain and its relationship with other entities. For example, different policies may be characterized in that: (i) isolation between certain OS services may be static and pre-determined; (ii) there may be provided pre-determined low/med/high security levels that can be set based on Boolean values; (iii) GPS geo-fencing parameters, or an application whitelist, may be downloaded; or (iv) an ability for debug access for personal domains may be configurable locally on the device. Any combination may also be implemented.

In some cases, the policy may be modified on the device (e.g. via the Domain Settings app 144-1, 144-2), and in other cases the policy may be downloaded from a remote server (e.g. for work domains). In one embodiment, the Domain Message Service 122 manages the download, verification, authentication and updating of policies, and the Domain Policy Service 126 manages the application of policies for each domain. The policy may then be distributed to the system component that applies the policy, which may be at the application level, middleware level or kernel level.

Application Management

Providing domain signaling as discussed above enables domain-specific installation and management of applications across different domains. In general, the Package Manager 136 may be configured to permit or forbid installation or execution of programs based on the DID of the current or a selected domain, or the policy associated with such.

Domain-specific installation and management of applications across different domains enables certain advantages. For example, domain signaling enables the installation and management of different application versions across domains. It is currently the case with Android™ that, when an application is updated by one user, it is also updated for all users. Such result is not always desirable. For example, an update to an application may request additional permissions or include features that have not been tested or supported by an enterprise and hence would not be desired in a work domain. Additionally, an enterprise may want an associated work domain to allow only white-listed applications, or specifically to black-list certain applications.

Providing different application access and control in different domains also provides for improved security options even when the domains are only ever accessed by a particular individual. For example, an Android™ device owner may prefer not to set up a Google™ Play™ store account in a generally unrestricted, open domain; if the device were stolen, the account would be available in the open domain, and the theft could result in costs to the device owner by the thief using the device owner's account. Thus, a device owner may desire not to enable the Play™ store application in an open domain, but instead only in another domain having a more restrictive security policy, e.g. generally requiring an access password which might be considered undesirably inconvenient to apply to the open domain.

Accordingly, the solution may include one or more modifications to the Android™ Package Manager 136 so as to make it domain aware, such that applications can be installed and updated according to domain policy. In one embodiment, the Package Manager 136 is configured so as to maintain a list of associations between the application identifier of each installed application and the domain identifier of each domain. When a process is launched, the execution context identifier created for the process is based on the application identifier of the application and the domain identifier of the domain in which the application is executed. In this way, the Package Manager 136 may be configured: (i) to allow the implementation of application white-lists and/or black-lists in selected domains, such that only approved applications may be installed in the domain; (ii) to enable an application to be copied or moved from one domain to another domain; (iii) when downloading an application, to prompt the user which domain or domains the application should be installed into regardless of which domain the account credentials reside; (iv) when setting up a new domain, to enable existing applications, and their configuration and data, to be copied or moved to the new domain; (v) when application updates are downloaded, to consider software versions on any application white-lists or black-lists to enable multiple different versions of an application in different domains (thus enabling selective control by enterprises, for example, of the installation and updating of tested and approved application versions, thereby providing a similar degree of application version control as with hypervisor solutions); and (vi) to enable an application to be deleted selectively from one domain, or multiple domains, but perhaps not others, based on user input, or based on downloaded policy with respect to domain related to that policy.

Windows Management

In one embodiment, the default configuration for the Window Manager 138 provides different screens for different domains, similar to state of the art. Domains may be switched using a notification shade, a navigator application (e.g. Domain Navigator 146-1, 146-2) or via buttons, icons, gestures or some combination of these, etc.

The solution also enables the Window Manager 138 to provide a more innovative user interface with a blended UI where applications associated with different domains are displayed on a single screen. For example, in one embodiment, the Window Manager 138 provides an overlay to one or more application icons that indicates with which domain the application is associated. An application that is associated with more than one domain may provide multiple icons, each with a different overlay (e.g. different color, different symbol, different outline, etc.) to represent with which domain the application is associated. Such an approach would eliminate the need to switch between domains, wherein domain access is indicated by the icon, and the user may be required to authenticate when accessing an application associated with a domain different from a current domain as required by the domain policy of the accessed application. Per domain policies and data isolation are maintained and enforced independently of the display mechanism. The performance of the solution is not impacted by having multiple icons. An advantage of this approach is there is no visual switching between domains. A disadvantage is the device home screen may become cluttered with icons and there is less visual indication of the domain the user is operating within.

Cross-Domain Communication

The system 100 may include a Domain Manager Service 124 for managing cross-domain communications, such as for cutting and pasting data, launching phone calls, notifications, data sharing, transferring data and application installation, among other functions. The Domain Policy Service 126 may act as single point for enforcing policy between domains.

For example, a user may wish to move or copy an application between domains. A work domain policy may implement an application whitelist approach to ensure that malware cannot enter the work domain to steal corporate information (e.g. work contacts or work documents). By way of further example, a notification in one domain may be made opaque when displayed in another domain, or perhaps not displayed at all, except when inside a corresponding protected domain. As another example, a work domain may restrict data, such as contacts, from leaving the work domain to prevent data leakage. While it may be acceptable for the user to import their personal contacts into the work domain, the reverse may not be permitted by the work domain policy. This is an example of one-way data sharing between domains configured by policy that would be managed by the Domain Policy Service 126.

External Communication

The system 100 may also manage in-bound and out-bound communication within the device. For this purpose, in one embodiment the Domain Manager Service 124 manages network connections and in-bound events that may require notifications, or intents to multiple domains. A simple example is the case of a dual number (e.g. dual SIM card) smartphone where policy would specify that calls to one number should be routed to a specific domain and calls to a second number registered with a different domain. Such communication is much more complicated in the case of a single phone number device receiving an in-bound phone call. Policy may dictate which contacts can be accessed for caller-id purposes and where the call log information should be registered. In some embodiments, the Domain Policy Service 126 may be a point for at least some policy enforcement, including access to hardware resources such as VPN, Bluetooth and WiFi network resources. For example, the policy of some protected domains may allow communications only when on specified networks.

Domain Enforcement

The system 100 also provides for enforcement of the domains and per domain policy, which is an additional requirement to the software functionality that creates and manages domains. Without enforcement of the domains and the domain policy, malware or rootkits could modify the system or kernel code statically or dynamically to prevent policy from being enforced, or to update the policy.

In one embodiment, the system 100 uses SELinux™ and the Linux™ Security Module (LSM) to implement Mandatory Access Control (MAC). MAC ensures that subjects (e.g. applications) only have access to the objects (e.g. application, files and resources) that are permitted by policy. This is enforced via the UID/GID combination which is created uniquely when each application is installed. As discussed above, in one embodiment of the system 100, the UID is extended or allocated also to represent domains.

SELinux™ generally applies, however, the same type (and thus policy) to all user downloaded applications, which means it does not enforce domains. Thus, SELinux may be modified also to become domain aware. In one embodiment, this is done via the role-based access control fields in the policy, or by creating different policies for different domains and using the Domain Manager 124 dynamically to adjust policy during run-time, or in the case of Android™ by assigning domain specific SELinux™ security labels to processes when they are created by modifying Zygote and/or the Middleware Mandatory Access Control features of SEAndroid™ to become domain aware.

Tightly restricting application access to system level resources is just one of a number of security enhancements that can be implemented at the kernel level. The Domain Kernel Module 114 can perform other domain aware security, such as: control debug access, check updates to policies (authentication and integrity verification), encryption of domain data, check load time application signatures, access secure hardware and secure operating system components (if available) and control access to hardware resources such as the network, camera and GPS. The Domain Kernel Module 114 may also provide device-wide security settings, such as: integrity verification of the kernel on boot, secure storage of policies, integrity verification of itself and other system level resources (e.g. domain policy engine), ensuring SEAndroid™ is turned on, and remote attestation.

It should be noted that domains are not the same as user and administrator accounts. While a device owner could have a special account that granted certain privileges for creating and deleting accounts, such privileges are not equivalent to root access and may be limited for domains that are managed by a third party administrator (e.g. a work IT administrator). By using SELinux™ and SEAndroid™, along with granular domain signaling as described herein, applications and application data remain isolated, even when there are different policies and access controls between domains. Malware in one domain cannot access data or applications in another domain.

Domain Switching

Figure 4:
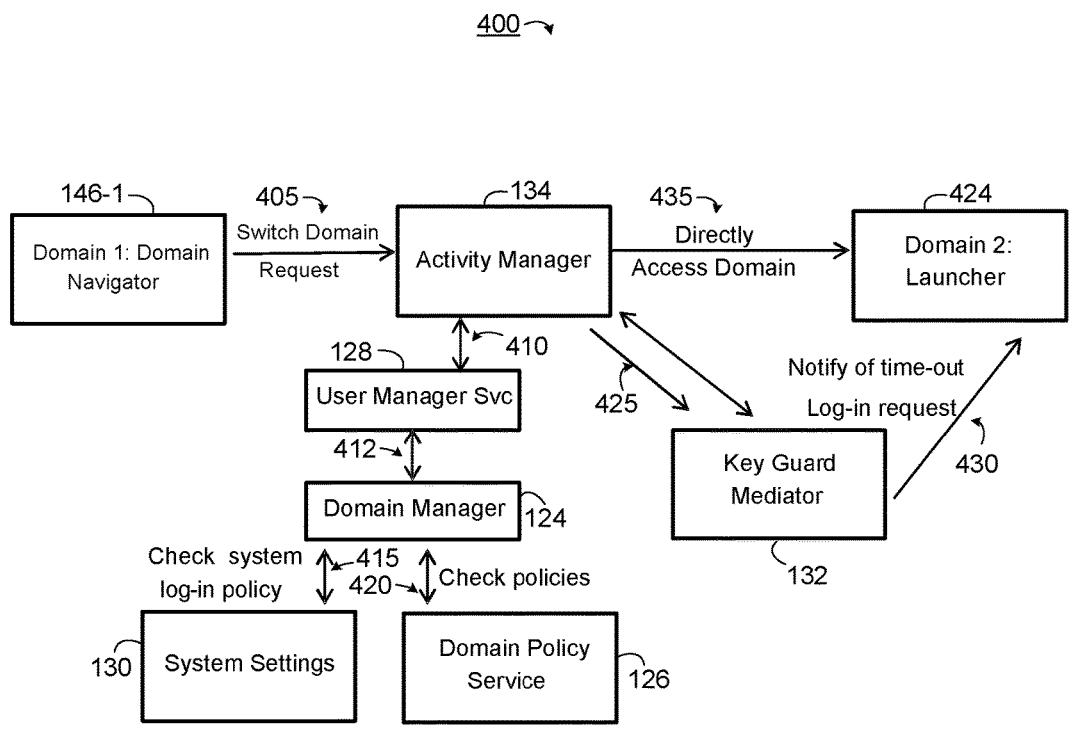
FIG. 4 shows a block diagram illustrating a method of switching from a first domain to a second domain.

A block diagram 400 illustrating one embodiment of a domain switching method from a first domain 142-1 to a second domain 142-2 is shown in FIG. 4. A user enters an input requesting a switch to the second domain using Domain Navigator 146-1. Domain Navigator 146-1 signals (action 405) to Activity Manager 134 to switch to the second domain 142-2. If the second domain 142-2 is associated with a different user from the user associated with the first domain 142-1, (e.g. from Domain A1 to Domain B1 in FIG. 3), then the Activity Manager 134 signals (action 410) to the User Manager Service 128 to log-out the user, but otherwise does not do so. In response to a call (action 412) from the User Manager Service 128, the Domain Manager service 124 checks with the System Settings Module 130 the login policy associated with the second domain 142-2 (action 415), as well as with the Domain Policy Service 126 for any other policies for enabling such switching to occur (e.g. GPS geo-fencing, network access requirements, kernel integrity) (action 420). The Activity Manager 134 notifies the Key Guard Mediator 132 of any time-out of the first domain 142-1 (which may be immediate or delayed by a predetermined period) (action 425). The Key Guard Mediator 132 implements the policy associated with the second domain 142-2. If the policy check is satisfied, then the Key Guard Mediator 132 is notified of the switch to the second domain 142-2 and decides access based on the policy, e.g. authentication required for access (action 430), or directly access domain (e.g. if no authentication is required) (action 435), or alternatively may deny the switch. Following the switch, the Activity Manager 134 executes an application launcher 424 in the second domain 142-2.

In another embodiment, as mentioned above, a domain switch could be implied when selecting an application and the Domain Navigator would not be needed.

In some embodiments, a domain switching method may be configured to enable secure switching to an encrypted domain. Data files associated with one or more domains may be encrypted such as using a cryptographic stacked filesystem. For example, the eCryptFS filesystem (http://ecryptfs.org) is a POSIX-compliant enterprise cryptographic stacked filesystem for Linux. Where the data files associated with a domain are so encrypted, the domain may be considered an encrypted domain. Symmetric keys may be used to encrypt and decrypt an encrypted domain's data, and may be stored in the Linux kernel keyring (a secure store in kernel memory), but may also be stored in any secure store. In a cryptographic stacked filesystem, it is typical for multiple symmetric keys to be used, though it will be understood that in some embodiments a single key may be used.

As described above, a device having multiple domains may include one or more domains which require authentication for access. For example, where the device operating system is Android, the built-in Android lock screen authentication (pattern, pin, password, etc.) may be used to control access to a domain. If the domain is also encrypted, this lock screen authentication may also be used to encrypt and decrypt the keys used by the cryptographic filesystem to access the encrypted domain's data.

Inasmuch as a device may have multiple domains, one or more of which may be encrypted, and one or more of which may require authentication, there are four possible scenarios when switching from a current domain (the domain currently possessing the user interface (UI) focus) to a different, target domain: the domain is already running; the domain is not running, and is not encrypted; the domain is not running, is encrypted, but does not require authentication; and the domain is not running, is encrypted, and requires authentication. (A domain is considered to be running if processes associated with the domain are running.)

Figure 9:
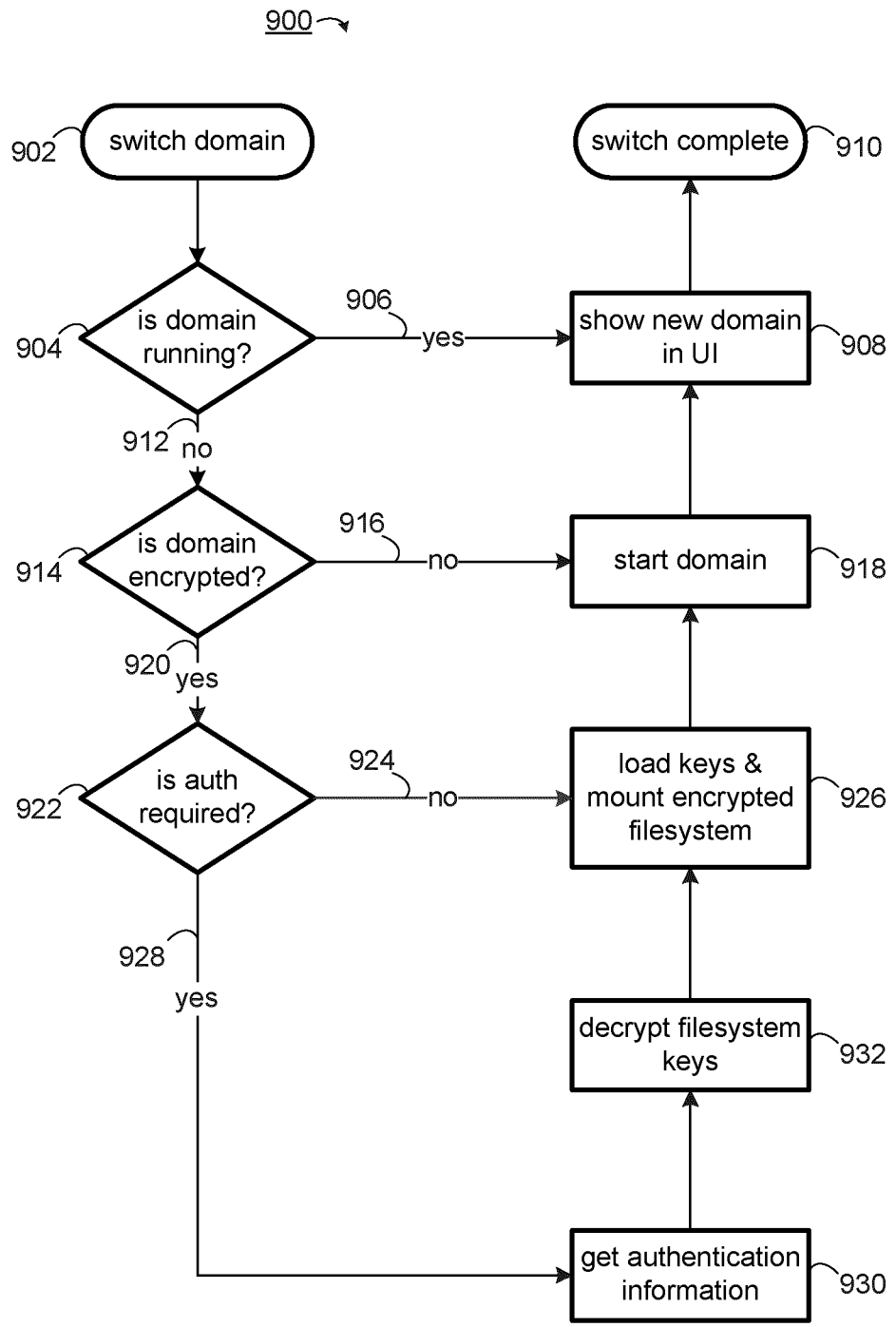
FIG. 9 shows a block diagram illustrating a method of switching from a current domain to another domain.

In view of these possibilities, a method 900 of switching from the current domain to a target domain is illustrated in FIG. 9. As illustrated, a domain that is running can be switched to immediately. Upon receiving an input to switch to a target domain (start 902), it is determined whether the domain is running (decision 904) and, if so (branch 906) the target domain is shown in the UI (step 908) and the switch is complete (end 910). If the domain is not running (branch 912), then it is determined whether the domain is encrypted (decision 914); if not (branch 916) the domain is started (step 918), shown in the UI (step 908), and the switch completes (end 910). If the domain is encrypted (branch 920), then it is determined whether the domain requires authentication (decision 922); if not (branch 924), then the decryption keys can be loaded and the filesystem mounted (step 926), the domain started (step 918), shown in the UI (step 908), and the switch is complete (end 910). If authentication is required (branch 928), then authentication information is received (step 930), the filesystem keys are decrypted based on the authentication information (step 932), the decryption keys are loaded and the filesystem mounted (step 926), the domain started (step 918), shown in the UI (step 908), and the switch is complete (end 910).

Thus, as may be seen in FIG. 9, an unencrypted domain that is not currently running can be started and immediately switched to. If an attempt is made to switch to an encrypted domain, however, the cryptographic filesystem keys must be loaded into the Linux kernel keyring before the domain can be used. If the encrypted domain does not require authentication, the cryptographic filesystem keys can be loaded, and the filesystem mounted without user intervention. If the encrypted domain does require authentication, however, the cryptographic filesystem keys themselves must first be decrypted before they can be loaded, and the filesystem mounted. Thus, in the final case of starting an encrypted domain that requires authentication, a mechanism is required to collect the authentication data for the target domain before that domain's data can be accessed (mounted).

In many device operating systems, however, the authentication process must operate in or in association with a current domain. For example, the existing lock screen authentication mechanism built into Android authenticates the current user or domain. When switching to a target domain the Android lock screen runs processes for the target domain from the lock screen, such as: Lockscreen Widgets, Live Wallpapers, and Input Method Editors (IMEs). In order to preserve the traditional Android user experience, the authentication needs to happen after the domain switch.

There are several alternative methods of providing this functionality, as follows.

In a first alternative, a custom user interface (UI) is provided to obtain the authentication information prior to switching to the target domain. While this method possesses a number of benefits which may render it appropriate in some circumstances, it also suffers from certain disadvantages, as follows. For example, this method requires effort effectively to duplicate the authentication mechanism already built into Android, and would require updating to maintain interoperability with updates to built-in Android mechanisms. Moreover, this method introduces security concerns, since the custom authentication UI processes would be running in the domain that the user is switching from. A sophisticated attacker could replace important application packages such as Input Method Editors (IMEs) in a potentially untrusted domain to capture the domain authentication information for a trusted encrypted domain.

In a second alternative, a method switches to the target domain first, but does not mount the target domain's data. The method then runs only those processes necessary for the lock screen to function, before mounting the target domain's data, and then complete the switch into the target domain. While this method possesses a number of benefits which may render it appropriate in some circumstances, it also suffers from certain disadvantages, as follows. For example, the application components that normally run from the lock screen (Lockscreen Widgets, Live Wallpapers, and Input Method Editors (IMEs)) can require access to the encrypted filesystem. It is not generally possible to determine what packages will be running a priori, since it is possible for both the user and original equipment manufacturer (OEM) to change, upgrade, or remove these components, so these issues cannot be anticipated and compensated for. Moreover, the domain switch operation does not complete until the domain authentication information has been provided. This leaves the device in an in-between, non-defined state that Android was not designed to deal with. This creates many additional edge cases, throughout the Android middleware that must be correctly handled, tested, and maintained between releases of Android.

In a third alternative, a method switches to an intermediate domain purposely created on the device to facilitate the secure collection of authentication information and to enable the safe transition between domains. The intermediate domain is started when switching to an encrypted domain which is not running, and requires authentication. This method overcomes many of the disadvantages possessed by the first two alternatives as described above.

Figure 10:
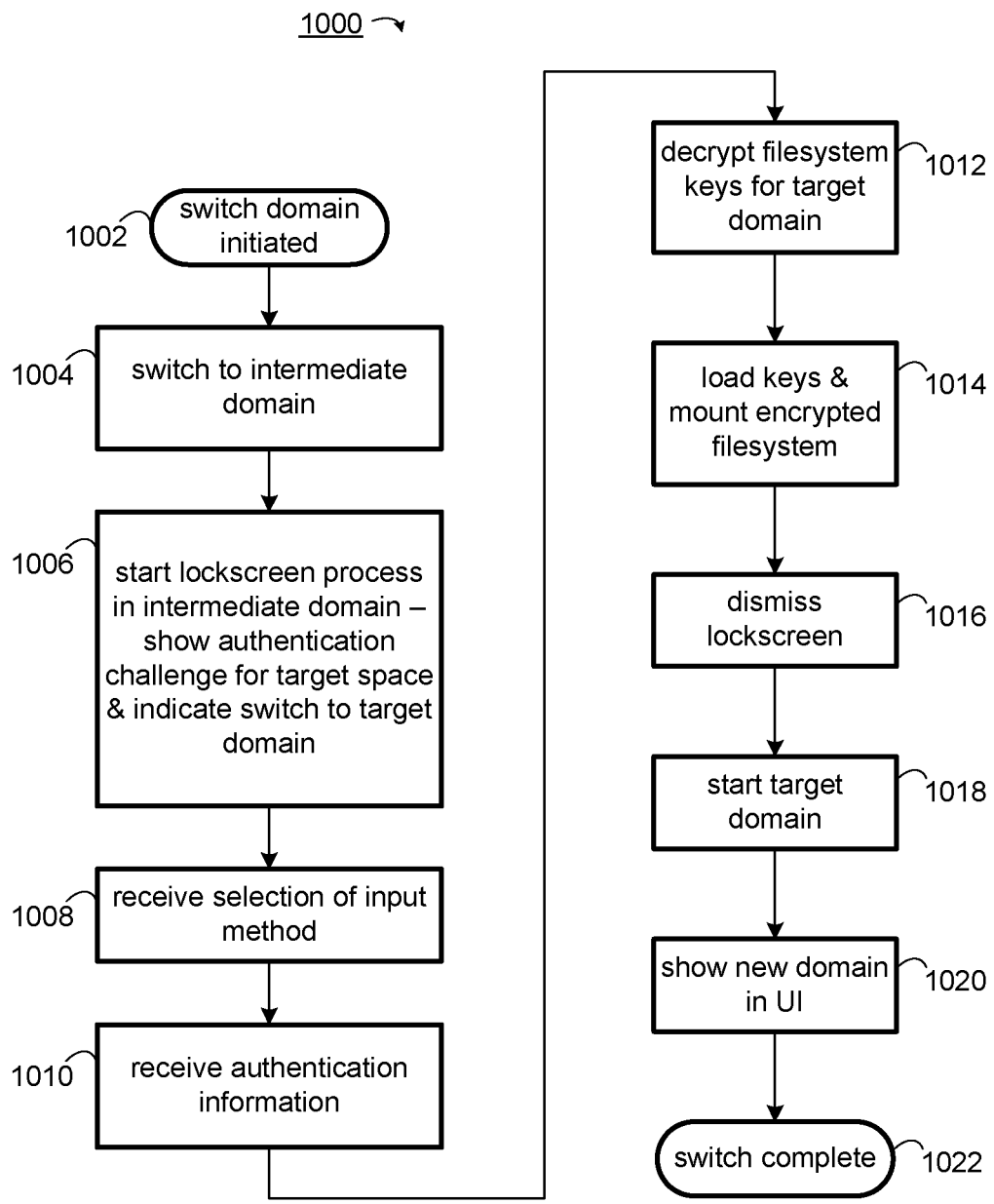
FIG. 10 shows a block diagram illustrating a method of switching from a current domain to a target domain which is not running, which is encrypted, and which requires authentication for access.

Thus, a method 1000 of switching from a first, running domain to a different, target domain, wherein the target domain is an encrypted domain (is associated with or has data files contained in an encrypted filesystem) and which is not running, is shown in FIG. 10. A domain switch is initiated to the target domain (start 1002). The target domain is not running, is encrypted, and requires authentication. The intermediate domain becomes the current domain (as reported to the Android middleware) (step 1004), and a lock screen process is started in the intermediate domain (step 1006). The lock screen component is modified or is otherwise provided so that when invoked it will show the authentication challenge for the target domain, and show some indication identifying the target domain.

If some UI elements associated with the target domain are not stored in the encrypted filesystem, but are instead stored in another location (e.g. metadata in an unencrypted file or database), then such UI elements can be shown along with the authentication challenge. For example, a wallpaper associated with the target domain can be shown in this case. Alternatively, some other wallpaper or visual may be shown to indicate that a switch to the target domain is occurring. Similarly, if an IME associated with the target domain is stored otherwise than in the encrypted filesystem, then it may be used for receiving the authentication information. Alternatively, a user's selection of an IME for entering authentication information may be received (step 1008). (This may include the case where, for example, a language in the intermediate domain differs from that of the target domain.)

The authentication information is then received using the selected IME (step 1010). If the user provides the correct authentication information for the target domain, the cryptographic filesystem keys for the target domain are decrypted (step 1012), the keys are loaded, and the filesystem is mounted (step 1014). The lock screen that would normally be displayed in the target domain is dismissed (step 1016). (This is no different than if the user had authenticated in the domain directly, and provides a seamless user experience to how lock screen authentication would work for unencrypted domains.) The target domain is started becomes the current domain (step 1018). The new domain is shown in the UI (step 1020), and the domain switch is completed (end 1022).

As noted, this method overcomes at least some of the disadvantages of other methods of switching to an encrypted domain that is not running, and further provides a number of advantages, as follows.

For example, it is an advantage that the authentication process happens outside of any user controllable domain, making the collection of authentication information more secure. Processes run from the lock screen are run in a controlled environment that is less prone to interference from changes in other user accessible domains. The changes required in the Android middleware are easier to maintain, and are more readily compatible with the multi-user state machine built into Android. This leads to fewer defects, less maintenance, and better forward compatibility. Attacks on the IME (e.g. replacement, or privilege escalation), or user interface for the key guard are harder to perform and would minimize the gains (e.g. access to intermediate domain) compared to the other options outlined above. Additional performance and storage needed is minimal.

A number of implementation options are available. The intermediate domain may be created on first boot of the operating system, or alternatively may be created any other time before a first encrypted domain is created. The intermediate domain may be locked down to prevent a user from doing anything other than authenticating. The expression 'locked down' may be understood as meaning disabling any applications, services, or other aspects which are not needed, or instead selectively enabling only those particular applications, services, or other aspects which are needed. For example, it may include disabling lock screen widgets and Google search. The intermediate domain may be further locked down using policy mechanisms (including SELinux and SEAndroid) to further minimize security risk. Unlike other domains, the intermediate domain only runs briefly when switching between domains. When running, it does not get counted as a running domain against the maximum limit of three active running domains maintained by Android. Thus, moving to the intermediate domain does not cause other domains to be shut down. When starting and stopping the intermediate domain, Android does not send many of the broadcasts that are typically sent when starting a domain. This makes a significant performance improvement, since it prevents unnecessary processes and apps from being launched. The intermediate domain can have a minimum of apps installed in the domain using white-list, disable lists, blacklists, etc., to reduce the security risks these apps may present.

The intermediate domain may be preconfigured with a certain selection of permitted applications, services, etc., or may be provisioned dynamically in a manner similar to other domains, e.g. by the use of a policy specific to the intermediate domain, using the same or similar enforcement mechanisms as are used by all domains.

Domain Message Service Protocol

Figure 5:
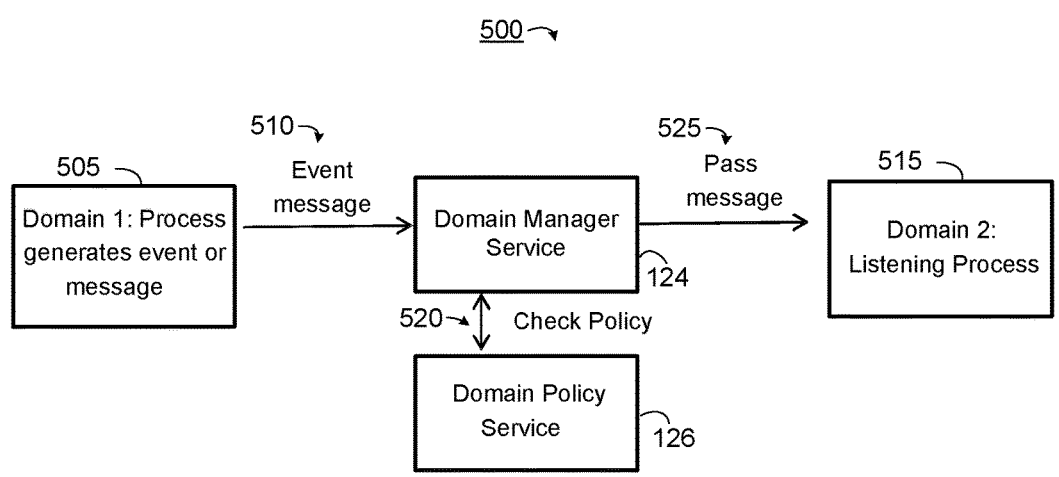
FIG. 5 shows a block diagram illustrating a domain messaging method.

A block diagram 500 illustrating a domain messaging method is shown in FIG. 5. A first process 505 associated with a first domain 142-1 generates an event message (e.g. a message received notification (wherein the message may be an email), a cut-and-paste action, a file copy). The first process 505 generating the event sends a message regarding the event (which may take the form of a broadcast) and is received by the Domain Manager Service 124 (action 510). In one embodiment, a second process 515 operating in a second domain 142-2 may be a listening process, but it will be understood that, alternatively, an API could be used. The Domain Message Service 122 checks if listening processes in other domains, such as second process 515 in second domain 142-2, are configured to respond to the received event message.

Having determined that the second process 515 in second domain 142-2 is so configured, the Domain Manager Service 124 signals the Domain Policy Service 126 regarding the event message type (e.g. notification, clipboard buffer, file) (action 520). The Domain Policy Service 126 implements the relevant policy, which may result in a number of different actions. For example, the requested event may be allowed (e.g. a buffer of less than 100 characters may be passed), or disallowed (e.g. policy may allow a file to be transferred to a domain, but prevent such file transfer from the domain). Alternatively, the policy may result in the message being filtered (e.g. certain fields can be made opaque, or only badge notification provided such as notification of receipt of an email without details, such as sender, subject, etc.). In accordance with the policy, the event message is passed to the second process 515 in the second domain 142-2 (action 525).

Cross Domain Execution Protocol

Figure 6:
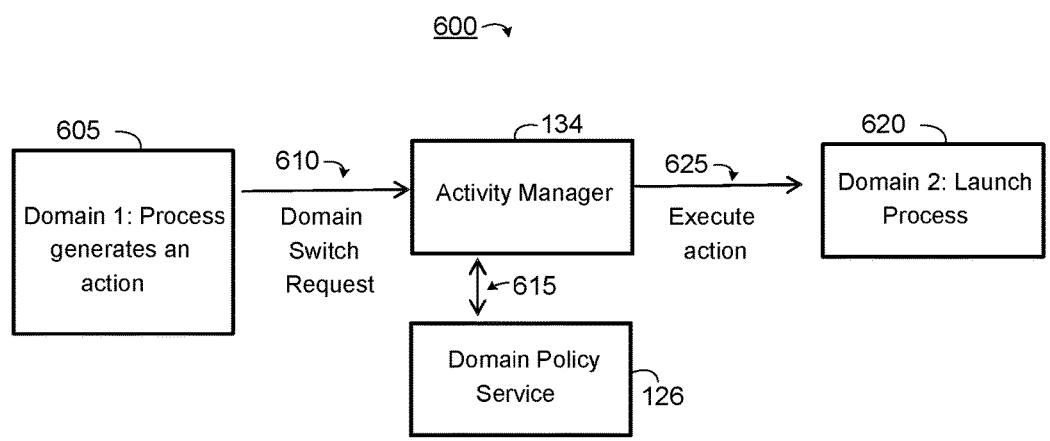
FIG. 6 shows a block diagram illustrating a cross domain execution method.

A block diagram 600 illustrating a cross domain execution method is shown in FIG. 6.

In the method, a first process 605 in a first domain 142-1 generates an action, wherein the action requests some action to be performed in connection with a second domain 142-2. For example, a notification of a new email may be selected in a first domain, and a request entered to view the email in a second domain. Alternatively, using the Domain Settings 144-1 service in a first domain 142-1, a request to delete a second domain 142-2 may be entered. Or, while operating in a first domain 142-1, a request may be entered to perform a telephone call from a second domain 142-2 to a specific telephone number.

Following creation of the action by the first process 505 in the first domain 142-1, the Activity Manager 134 receives a domain switch request (action 610) from the first process 505. If authentication is required for the switch, then the request is denied if the authentication fails. The Activity Manager 134 signals the Domain Policy Service 126 to check the respective policies associated with the first domain 142-1 and second domain 142-2 (action 615), in order to determine that both policies permit the requesting first domain 142-1 to initiate the requested action with the second domain 142-2.

If both policies so permit, the Activity Manager 134 launches the requested second process 620 in association with the second domain 142-2 (action 625). Further to the examples introduced above, an email service may be launched, or the Domain Settings 144-1 service may be launched and the user prompted to confirm deletion of the second domain 142-2, or a telephone service may be launched with the desired number to call displayed.

Domain Application Installation Protocol

Figure 7:
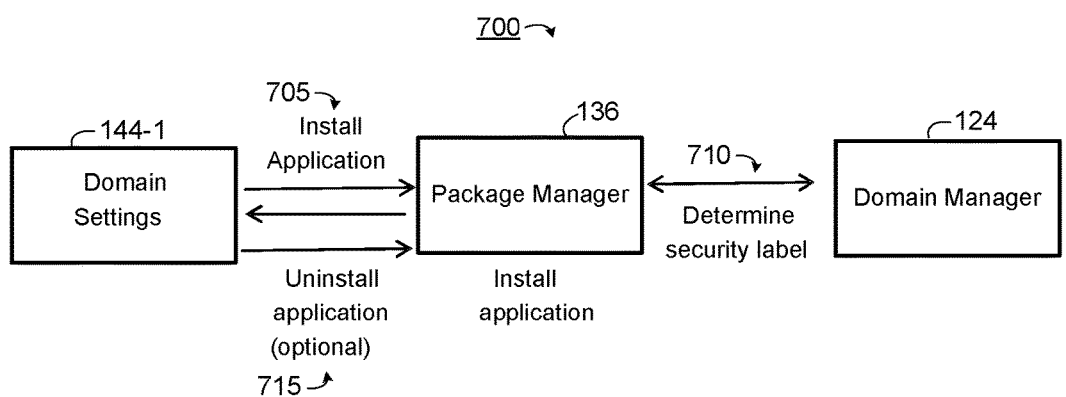
FIG. 7 shows a block diagram illustrating a domain application installation method.

A block diagram 700 illustrating a domain application installation method is shown in FIG. 7, wherein an application installed in a first domain is moved or copied to a second domain.

As discussed above, an application may be installed in association with a selected secure domain, in which case the DID of the domain is stored in association with the application identifier of the installed application.

Using the Domain Settings 144-1 service, a user may select a move or a copy of an application to a different domain, e.g. from a first domain 142-1 to a second domain 142-2. The Domain Settings 144-1 service signals the Package Manager 136 to install the application in the second domain 142-2 (action 705). The Package Manager 136 signals the Domain Manager 124 to determine a security label for the second domain 142-2 (action 710). The Package Manager 136 then installs the application in the second domain 142-2 with the correct security label received from the Domain Manager 124. If the selected action is a move, as opposed to a copy, the Domain Settings 144-1 service then signals the Package Manager 136 to uninstall the application from the first domain 142-1 (action 715) and transfer the application user data to the new domain as well.

Update Policy Protocol

Figure 8:
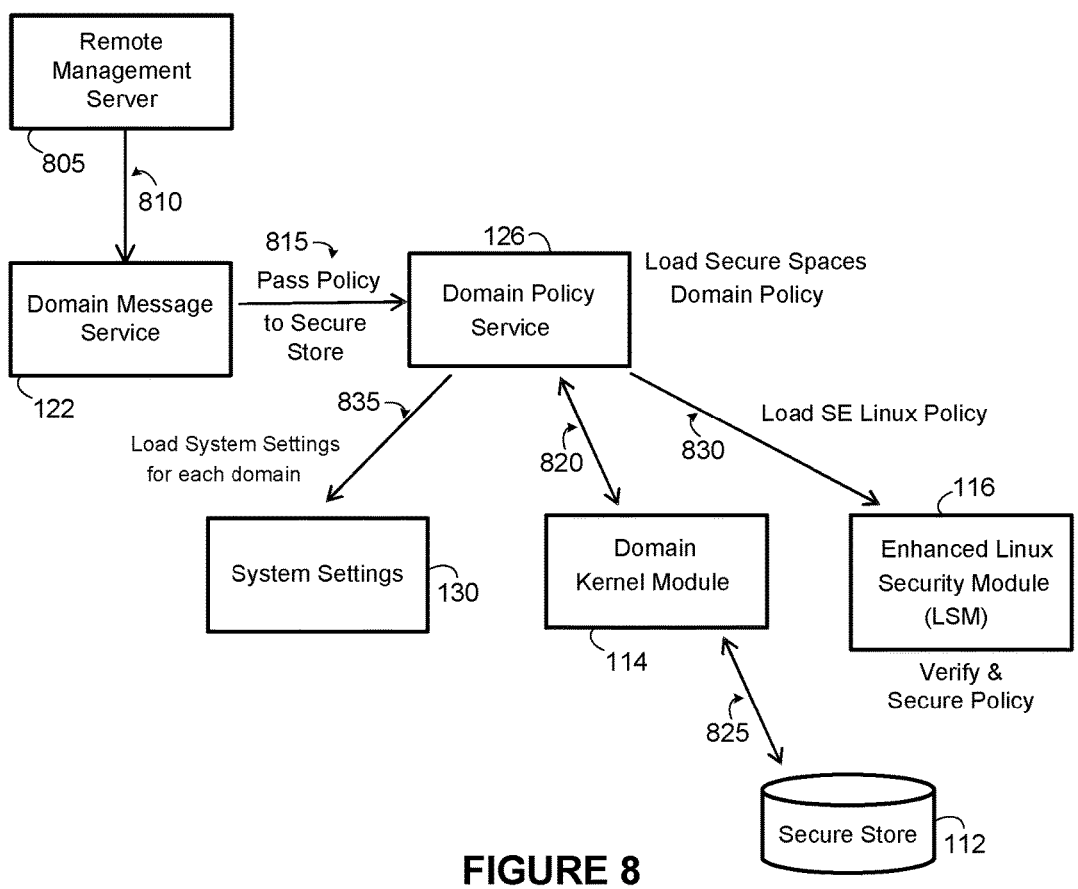
FIG. 8 shows a block diagram illustrating an update policy method.

A block diagram 800 illustrating an update policy method is shown in FIG. 8.

The Domain Message Service 122 receives a policy from a remote management server 805 (action 810), or alternatively via a settings screen on the device, or via an API, which then passes to the policy to the Domain Policy Service 126 (action 815) and then the Domain Kernel Module 114 (action 820) as appropriate which may store the policy in the Secure Store 112 (action 825). The integrity and authenticity of the origin of the policy is verified by the Domain Kernel Module 116. Anti-rollback mechanisms may be applied within the Domain Kernel Module 116 or the Secure Store 112 to ensure that older policies cannot be re-used or replayed. The Domain Policy Service 126 then loads the policy and previous policies in order to apply smartly only those policies that have changed in the updated policy. The Domain Policy Service 126 may signal to the Enhanced Linux Security Module 116 to load an updated SELinux portion of the policy (action 830). The Domain Policy Service 126 signals the System Settings Module 130 service to update policies that are applied in and enforced by the System Settings Module 130, such as password strength, wallpaper and launcher (action 835). The Domain Policy Service 126 then updates its own policies that are specific to domains, such as domain encryption, domain debug access, cross domain policies and domain name.

Advantages

The present solution provides a means to securely establish, maintain and administer separate protected domains and to define and isolate the applications and data in such separate protected domains. The present solution is efficient in terms of memory, space and computing power compared to the state of the art. It maintains the native operating system features, including backward compatibility for applications. It maintains the native and intuitive device user interface in some domains, yet enables many different user interface options and policies in other domains rather than the tradition "all-or-nothing" device lock and/or user account access. It enables dual persona, multi-persona, multi-domain usage between multiple personal, multiple work and "open" domains on one device, with different domain owners. It enable remote administration and policy updates for such multiple domains. It allows for different access control and policies for each domain. It allows policy to determine if data can be transferred between domains or not. It enables new usage models more suitable to mobile devices, including temporary sharing. It enables more granular control of applications available in each domain compared to other solutions. The solution can significantly simplify, or even eliminate, the operating-system level "hard switching" between domains, associated with hypervisor-based virtualization where each domain operates in association with a separate set of operating system processes which may be duplicated by each corresponding hypervisor. It isolates applications and application data between domains, without the vulnerabilities of current solutions. It isolates applications and data in a domain from malicious application outside of the domain. Finally, it addresses the privacy concerns and freedom of choice of mobile device users.

There are significant benefits and features introduced with the domain signaling, domain management and domain enforcement, independent of the implementation details. These are as follows. The solution maintains the original native operating system features, including backward compatibility for applications. All the native operating system permission checks and IPC mechanisms will co-exist and still be effective. The operating system operates unchanged and the solution is backwards compatible with the previous operating system. The solution is efficient in terms of memory, space and computing power compared to the state of the art. Device performance and storage and memory usage are very efficient compared to alternative approaches such as virtualization which duplicates the operating system stack incurring substantial CPU and RAM overhead. Switching between domains is very fast and efficient compared to prior art because of the native OS implementation.

The solution enables dual persona, multi-persona, multi-domain usage between multiple personal, multiple work and "open" domains on one device, with different domain owners. Multiple protected domains can easily be added and enforced with negligible memory and performance impact. There can be multiple protected work domains on a single device. For example, if the user has multiple customers, there could be Company X domain, and Company Y domain on the same device. Alternatively a device can be configured to have a Company Confidential domain and a Company Classified domain, each with different policies (e.g. the security policy for applications that reside in the Company Classified domain can be more restrictive such as they may only be accessible during normal working hours or while the device is connected to a company WiFi network). A device can be configured to have an open sharing domain for ease of access and to enable ad-hoc sharing of the device and applications in the open domain with a family member or colleague. A user can have a protected domain for private purposes, such as to isolate messaging and contact information pertaining to a clandestine relationship or for mobile banking and commerce purposes. A service provider that is not an employer of the device owner, such as a bank, may desire to have a protected domain on the device which contains a variety of applications for accessing their services, such as account access, credit or debit card services, equity trading, quotations for services, such as insurance, loans, etc. The service provider would have the confidence that their applications and the user's personal information associated with such applications were secure and could be wiped or locked in event of device loss.

The solution allows for different access control and policies for different domains, between domains and for inbound and out-bound communications from protected domains on a single device. Domain policy can be either locally administered (e.g. via device settings) or remotely administered (e.g. via a cloud service). Policy can also be either administered by the device owner or a third party, such as an employer or a service provider. Cross domain communications and data sharing can be policy defined and enforced. Data encryption can be domain aware. Phone functionality, caller notification and emergency calls, etc. can be domain aware and based on policy. For example, out-going calls could be blocked from certain domains. Network connectivity can be domain aware and policy enforced. The task selector and process display can be domain aware. For example, processes may only be displayed if the domain is logged in. Notifications can be domain aware based on policy. For example, work domain notifications could only be visible from a certain page to avoid data leakage during sharing. Or, the notification could indicate the application providing the notification but with reduced information (e.g. not disclose the title of the email received, or the sender of the SMS received, etc.). Cloud back-up and syncing mechanisms can also be domain aware. For example, the open domain could be backed-up, even if there is not a specific account associated to the domain.

The solution maintains the original native and intuitive user interface, yet enables many different user interface options and policies between different domains rather than the tradition "all-or-nothing" device lock and/or traditional multi-user account access. The user interface and switching between domains can now be customized to the type of domain transition. A traditional user account style interface can be maintained and each domain can still be personalized and configured for each domain with all the standard native OS capabilities, such as with different background and/or different launch screen per domain. The user authentication mechanisms (e.g. password, biometric, pattern, no authentication) can be configured per domain. Domain log-in policies can be used to reduce or eliminate the need to repeatedly authenticate the user when switching between domains. Access control and authentication techniques can be enforced for each protected domain in accordance with the policy set for the domain (e.g. automatic log-out after 15 minutes of device inactivity, or automatic domain log-out after 5 minutes of domain inactivity, or re-authentication every 10 minute when within a certain domain, etc.). The solution enables new usage models more suitable to mobile devices, including ad hoc sharing of applications, such as via an open domain. This is an extension to recent features in mobile devices where some device capabilities are available from the device lock screen without requiring authentication (e.g. the user can still take a picture, or receive an incoming call). Rather than limiting functionality, with the domain signaling and domain isolation enforcement, the open area can provide full feature access to applications, although could have other special policy, such as restricted Internet access (e.g. none, or via WiFi only) and restricted phone access (e.g. incoming only, or local calls only, etc.). Switching between domains can be eliminated by using other means to display domains (e.g. overlays on icons). The device owner can keep domains separately grouped (perhaps for privacy reasons or personal preferences) in folders, tabs or any other mechanism supported by the operating system. Authentication policy per domain would still apply when accessing a tab or a specific application, but the need for switching and different domain "home screens" and wallpapers, etc, could be eliminated.

The applications available in each domain can be controlled and displayed at a more granular level compared to other solutions, while only storing one copy on the device, thus providing a very efficient use of memory and CPU. The package manager can manage the installation of applications in each domain—which it does already between user accounts—but with more elegant, domain-specific mechanisms. The availability, display and access to applications can be controlled per domain by policy. Application data can be isolated per domain (in addition to per user account) and can be easily deleted and managed per domain (e.g. if device is lost, or employment terminated, etc.). Applications can be moved or swiped between domains in more intuitive and creative ways, similar to moving Applications between home pages and tabs, rather than performing application installation per domain such as with Android 4.2.

The solution can enforces the application and application data isolation as specified by the domains with a domain aware version of SE Linux. It can ensures that access by applications on one domain cannot access another domain. It ensures that cross domain calls are only possible via the Domain Manager Service which enforces policy. It ensures that malware on one domain cannot impact the applications and data in another domain. It ensures that the use of domains without authentication does not impact the security of other domains.

The present solution does not impact the use of the other security techniques, such as virtualization and containers because the solution is backward compatible with those techniques. In particular, type 2 hypervisors with modification could leverage the domain information as part of the switching between the different operating systems. Application container solutions may also be deployed in the present solution.

While the above embodiments have been described particularly in connection with the Android and Linux operating systems, it will be understood that the principles disclosed herein are applicable to any operating system possessing the relevant characteristics addressed by the disclosure.

While the device operating the operating system has been referenced above as a mobile device, which may include a smartphone, tablet, personal digital assistant (PDA), smartwatch, or any similar device, it will be understood that the principles disclosed herein are applicable to any device possessing the relevant characteristics addressed by the disclosure, and in some embodiments includes a general purpose computer.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method performed by a processor of a computing device to provide a plurality of secure domains in an operating system of the computing device, the method comprising:
(a) for each secure domain:
(a1) associating resources of the secure domain with a unique domain identifier, the resources comprising at least one data file or at least one application; and (a2) storing a policy in association with the unique domain identifier, the policy comprising a rule set for controlling access to the resources;
(b) receiving a selection of one of the plurality of secure domains as a current domain, wherein the plurality of secure domains comprises a target domain different from the current domain; and
(c) controlling access by a process to the target domain resources based on the policy associated with the current domain and the policy associated with the target domain, wherein the process is associated with the current domain,
wherein (c) is performed at least in part by a first service operating within a kernel of the operating system and at least in part by a second service operating in a middleware of the operating system outside of the kernel, and
wherein (a) and (b) are performed by further services operating in the middleware of the operating system outside of the kernel.

2. The method according to claim 1 further comprising executing at least one yet further service of the operating system at least partly outside of a kernel of the operating system to perform at least one of (a), (b), and (c).

3. The method according to claim 1, wherein the operating system implements a plurality of user accounts, and wherein the current domain and the target domain are commonly associated with one of the user accounts.

4. The method according to claim 1, wherein the process is associated with an execution context identifier based on the unique domain identifier of the current domain, and wherein (c) comprises controlling access by the process to the target domain resources based on the execution context identifier.

5. The method according to claim 4, wherein the resources of the current domain comprise the at least one application, and wherein the execution context identifier is based on the unique domain identifier of the current domain and a unique application identifier associated with the at least one application executed to generate the process.

6. The method according to claim 5, where the operating system is an Android operating system, the unique application identifier is a Unix-type user identifier (UID) assigned to the application on installation, the execution context identifier comprises the UID of the application, and the unique domain identifier is contained in reserved bits of the UID.

7. The method according to claim 1, wherein the operating system provides a user interface providing concurrent access to the resources of the current domain resources and the resources of the target domain.

8. The method according to claim 7, wherein the resources of target domain comprise the at least one application associated with the target domain, and wherein the user interface provides means for executing the at least one application.

9. The method according to claim 8, wherein the user interface implements an icon associated with the at least one application of the target domain, wherein the icon comprises an overlay signifying the association of the at least one application with the target domain.

10. The method according to claim 7, wherein the resources of the target domain further comprise a received message associated with the target domain, and wherein the user interface provides means for opening the message.

11. The method according to claim 1, wherein (a1) comprises storing metadata associating the resources with the unique domain identifier of the secure domain.

12. The method according to claim 1, wherein one of the secure domains is an externally-controlled domain, and wherein the policy associated with the externally-controlled domain is received from a remote domain management server via a network.

13. The method according to claim 12, wherein the current domain is the externally-controlled domain, and wherein modification to at least a portion of the policy associated with the current domain is blocked except by the remote domain management server.

14. The method according to claim 1, wherein the target domain resources comprise the at least one application comprising a first version of a common application, the policy associated with the current domain and the policy associated with the target domain block access to the first version of the common application.

15. The method according to claim 14, wherein the current domain resources comprise the at least one application comprising a second version of the common application different from the first version of the common application.

16. A tangible non-transitory computer-readable medium comprising instructions stored thereon that, when executed by a computer, perform the method of claim 1.

* * * * *